US011475487B1

(12) United States Patent
Tipograph et al.

(10) Patent No.: US 11,475,487 B1
(45) Date of Patent: Oct. 18, 2022

(54) METHODS AND SYSTEMS FOR COLLABORATIVE INSTANTIATION OF SESSION OBJECTS AND INTERACTIVE VIDEO-BASED REMOTE MODIFICATION THEREOF

(71) Applicant: TIPO ENTERTAINMENT, INC., Brooklyn, NY (US)

(72) Inventors: Rachel Tipograph, Brooklyn, NY (US); Adam Van Lente, New York, NY (US)

(73) Assignee: Tipo Entertainment, Inc., Brooklyn, NY (US)

( * ) Notice: Subject to any disclaimer, the term of this patent is extended or adjusted under 35 U.S.C. 154(b) by 177 days.

(21) Appl. No.: 15/946,780

(22) Filed: Apr. 6, 2018

Related U.S. Application Data

(60) Provisional application No. 62/482,571, filed on Apr. 6, 2017.

(51) Int. Cl.
*G06Q 30/02* (2012.01)
*G06Q 30/06* (2012.01)
*H04L 67/02* (2022.01)
*H04L 67/146* (2022.01)

(52) U.S. Cl.
CPC ..... *G06Q 30/0277* (2013.01); *G06Q 30/0267* (2013.01); *G06Q 30/0633* (2013.01); *G06Q 30/0643* (2013.01); *H04L 67/02* (2013.01); *H04L 67/146* (2013.01)

(58) Field of Classification Search
CPC combination set(s) only.
See application file for complete search history.

(56) References Cited

U.S. PATENT DOCUMENTS

| 6,101,482 A * | 8/2000 | DiAngelo | G06Q 30/0625 709/227 |
| 7,512,548 B1 * | 3/2009 | Bezos | G06Q 30/0214 705/26.1 |
| 8,108,271 B1 * | 1/2012 | Duncan | G06Q 10/087 705/28 |

(Continued)

OTHER PUBLICATIONS

Johnson, Lauren (May 14, 2015), This App Turns Mobile Shopping Into Clever Infomercials. Retrieved from https://www.adweek.com/digital/app-turns-mobile-shopping-clever-infomercials-164742/. Hereafter: Johnson. (Year: 2015).*

*Primary Examiner* — Eric R Netzloff
(74) *Attorney, Agent, or Firm* — Cooley LLP

(57) ABSTRACT

A method for collaborative instantiation of remote session objects and interactive video-based modification thereof includes receiving a uniform resource locator (URL) via a first graphical user interface (GUI). A request is generated based on the URL, and is sent to a remote server. In response to the request, a data object including product data is returned, and the product data is modified, so as to generate normalized product data. A host server causes playback of a video within a second GUI that is associated with a mobile device of a user. A product selection is received at the host server during playback of the video and in response to a user interaction with the video. Normalized product data associated with the product selection is identified, and a message including the identified normalized product data is sent to the remote server to cause instantiation of a software shopping cart.

18 Claims, 20 Drawing Sheets

(56) References Cited

U.S. PATENT DOCUMENTS

| | | | |
|---|---|---|---|
| 9,111,307 B1 | 8/2015 | Hanni et al. | |
| 9,697,563 B2 | 7/2017 | Fitzpatrick | |
| 2001/0034658 A1* | 10/2001 | Silva | G06Q 30/0633 |
| | | | 705/26.8 |
| 2002/0038255 A1* | 3/2002 | Tarvydas | G06Q 30/0635 |
| | | | 705/26.43 |
| 2002/0042750 A1* | 4/2002 | Morrison | G06Q 30/0241 |
| | | | 705/14.4 |
| 2003/0115153 A1* | 6/2003 | Li | G06F 21/6254 |
| | | | 705/67 |
| 2003/0149706 A1* | 8/2003 | Neal | G06F 16/951 |
| 2009/0276805 A1* | 11/2009 | Andrews, II | G06Q 30/0251 |
| | | | 725/35 |
| 2011/0004517 A1* | 1/2011 | Soto | G11B 27/34 |
| | | | 705/14.51 |
| 2012/0310914 A1* | 12/2012 | Khan | G06F 16/951 |
| | | | 707/710 |
| 2013/0024441 A1* | 1/2013 | Sun | G06F 16/951 |
| | | | 707/710 |
| 2014/0019289 A1* | 1/2014 | Colucci | G06Q 30/0611 |
| | | | 705/26.4 |
| 2014/0215529 A1* | 7/2014 | Good | H04N 21/8583 |
| | | | 725/60 |
| 2014/0250211 A1* | 9/2014 | Spitz | G06Q 30/0251 |
| | | | 709/219 |
| 2015/0081457 A1* | 3/2015 | Agnes | G06Q 30/0601 |
| | | | 705/14.73 |
| 2015/0348153 A1* | 12/2015 | Isaacson | G06Q 30/0617 |
| | | | 705/26.43 |
| 2016/0012499 A1* | 1/2016 | Linevsky | G06Q 30/0633 |
| | | | 705/27.1 |
| 2016/0104231 A1* | 4/2016 | Taylor | H04N 21/2542 |
| | | | 705/26.81 |
| 2016/0125504 A1* | 5/2016 | Narayanan | G06F 3/0483 |
| | | | 705/26.8 |
| 2016/0371546 A1 | 12/2016 | Yadav et al. | |
| 2018/0053244 A1* | 2/2018 | Hendlin | G06Q 30/0621 |

\* cited by examiner

US 11,475,487 B1

METHODS AND SYSTEMS FOR COLLABORATIVE INSTANTIATION OF SESSION OBJECTS AND INTERACTIVE VIDEO-BASED REMOTE MODIFICATION THEREOF

CROSS-REFERENCE TO RELATED APPLICATIONS

This application claims priority to and the benefit of U.S. Provisional Patent Application No. 62/482,571, filed Apr. 6, 2017; the entire contents of the aforementioned application is herein expressly incorporated by reference for all purposes.

FIELD

The present disclosure relates to electronic commerce. More specifically, the present disclosure relates to providing enhanced, efficient interactive media and associated transactions, including shoppable interactive video interfaces.

BACKGROUND

The Internet includes advertisement media for web users. Advertisements can be included in a web page that is visited by web users. Advertisers can pay for the display of advertisements on certain web pages.

SUMMARY

In some embodiments, a method for collaborative instantiation of remote session objects and interactive video-based modification thereof includes receiving a uniform resource locator (URL) via a first graphical user interface (GUI). A request (e.g., including a hypertext transfer protocol (HTTP) GET method token) is generated based on the URL, and is sent to a remote server. In response to the request, a data object including product data is returned (e.g., received via a web interface of a host server), and the product data is modified, so as to generate normalized product data. A host server causes playback of a video within a second GUI that is associated with a mobile device of a user. A product selection is received at the host server during playback of the video and in response to a user interaction with the video (e.g., a haptic input or a selection of an "Add to Cart" button). Normalized product data associated with the product selection is identified, and a message including the identified normalized product data is sent to the remote server to cause instantiation of a software shopping cart while the video playback continues within the second GUI (i.e., the software shopping cart is instantiated without the user's browser being redirected to the remote server). The method can also include receiving a return message from the remote server, the return message encoding an indication that instantiation of the software shopping cart was successful. The method can also include passing a third URL to the mobile device, the third URL being associated with the software shopping cart, to cause navigation, via a browser of the mobile device, to the third URL. The shopping cart can be accessible via the mobile device. Such a method can significantly improve the efficiency of a consumer e-commerce transaction by reducing the volume of input data communicated from the mobile device. In other words, a single input (e.g., an action, such as a click or tap) from the user via the mobile device can trigger multiple steps (e.g., the communications between the host server and the remote server during instantiation of, and/or subsequent modifications of, a software shopping cart or other session object) to be remotely performed. Since the mobile device is not performing these "multiple steps," the video playback speed, browser speed and/or performance of the mobile device can also be improved by methods of the present disclosure, and interruptions to processing cycles of the mobile device's processor can be reduced or eliminated.

In some embodiments, an apparatus includes a processor and a memory operatively coupled to the processor. The processor is configured to receive, via a first graphical user interface (GUI) operably coupled to a host server, a URL associated with product data. The processor can also be configured to generate a request based on the URL, via the host server, and send the request to a remote server. The processor is also configured to receive a data object including the product data from the remote server in response to the request, modify the product data to generate normalized product data, and store the normalized product data in the memory. The processor is also configured to receive, via the first GUI, an indication of a video and an indication of a product to be associated with the video, and to generate a curated destination environment ("CDE") including the video and the selected product. The processor can send a signal to render the CDE within a second GUI associated with a mobile device of a user. During playback of the video, the processor can receive a message encoding a product selection in response to a user interaction with the CDE, and identify a portion of the normalized product data associated with the product selection. The processor can send a message to the remote server, the message including the identified portion of the normalized product data, to cause instantiation of a software shopping cart at the remote server. The processor can send a signal, in response to a user selection of a checkout object within the CDE, to cause a browser of the mobile device of the user to navigate to the software shopping cart at the remote server. In some such implementations, the CDE does not include a shopping cart instance. Rather, the CDE includes an object that the user can select to cause navigation of their browser to the remotely-hosted shopping cart instance. Such embodiments can improve the efficiency, speed and navigability of an e-commerce transaction, for example by reducing a number of user feedback actions needed to populate a shopping cart. This is especially desirable when e-commerce transactions are being performed on mobile devices with smaller screens that can be more time consuming to navigate (e.g., since the user often needs to enlarge portions of a display to ensure that they select the desired button/feature). Moreover, some implementations set forth herein include a "multicart" feature, by which a user can select multiple products and assign them to multiple different retailers (e.g., causing the remote instantiations, by the host server, of multiple associated software shopping carts at each of the retailers' websites) without the user needed to navigate, via the browser of the user's mobile device, to any of the retailers' websites. The ability of a user to add products to a remote cart via the CDE while continuing to view a video playback (via which additional products selection can be made, from the same or different retailers) directly contrasts with known shopping cart implementations, in which a user can only make products selections on a website of an individual retailer, and when the user adds a product to their shopping cart, the user is often redirected to the shopping cart, requiring the user to back-navigate if they wish to continue browsing/shopping.

In some embodiments, an apparatus includes at least one processor ("processor") and a memory operatively coupled to the processor. The processor is configured to receive product data from each of a plurality of remote servers, normalize the received product data to generate normalized product data, and store the normalized product data in the memory. The processor can cause playback, on a mobile device of a user, of a video stored in the memory (the video including, for example, a plurality of user-selectable objects, such as an "add-to-cart" object, and/or a plurality of minimercials), and receive, during playback of the video and in response to an interaction (also referred to herein as "feedback") between the user and the video (e.g., a haptic interaction), a message encoding a product selection. The processor then identifies a portion of the normalized product data associated with the product selection, and sends a message to a remote server, the message including the identified portion of the normalized product data, to cause instantiation of a software shopping cart at the remote server. A return message is received from the remote server, the return message including header (optionally including a set cookie header) and encoding an indication that instantiation of the software shopping cart was successful. The shopping cart can be accessible via the mobile device.

In some embodiments, a non-transitory processor-readable medium stores code representing processor-executable instructions, the code comprising code to cause the processor to receive a URL via a first graphical user interface (GUI) operably coupled to a host server. The processor can generate, via the host server, a request based on the URL, send the request to a remote server, and receive, from the remote server and in response to the request, a data object including product data. The processor can modify the product data to generate normalized product data, and store the normalized product data in a memory operably coupled to the processor. The processor can cause playback of a video (e.g., including a plurality of user-selectable objects and/or minimercials) within a second GUI, the second GUI being associated with a mobile device of a user, and receive a message encoding a product selection during playback of the video and in response to a user interaction with the video (e.g., a haptic interaction and/or a selection of an "Add to Cart" button). The processor can then identify a portion of the normalized product data associated with the product selection, and send a message to the remote server, the message including the identified portion of the normalized product data, to cause instantiation of a software shopping cart at the remote server. The shopping cart can be accessible to the user via the mobile device. The code can further include code to cause the processor to receive a message encoding a retailer selection at the host server during playback of the video and in response to a user interaction with the video.

The present disclosure relates to methods and systems for transacting media, including providing shoppable video layers that are accessible via, and/or implementable within, social media and the like. Some embodiments are embodied in a software application or "app" (e.g., MikMak Attach). The disclosed technology can facilitate shoppable video viewing experiences to users by allowing for the substantially concurrent, remote instantiation of shopping cart instances at various retailer-hosted websites while the users are viewing the video content. The app can be web-based and/or stored/run on the user's mobile compute device(s) (e.g., smartphone, tablet, etc.).

In some embodiments, a curated destination environment includes a web application (developed, for example, using Firebase) configured to reside within and/or interface with a social media application such as INSTAGRAM or Snapchat. The web application can include a shoppable video player, accessible via a destination URL that can be plugged into a client's social media post (e.g., INSTAGRAM or Snapchat). The destination URL links to a full screen video element with multiple overlayed, user-selectable objects/elements by which users (e.g., via a mobile device in communication with a host server hosting the web application) can toggle video sound, view additional details/information about a product, add the product to a remotely-hosted shopping cart, and/or checkout. A database of the host server can include data associated with one or more of: clients, brands, products, product information, product images, media (e.g., including video and/or audio files), video players, users, or user roles. User roles can include permission settings that control a specified user's ability to access a platform and/or one or more products, videos, or curated destination environments of systems set forth herein.

It should be appreciated that all combinations of the disclosed concepts above and additional concepts discussed in greater detail below (provided such concepts are not mutually inconsistent) are contemplated as being part of the inventive subject matter disclosed herein. In particular, all combinations of disclosed subject matter are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1:
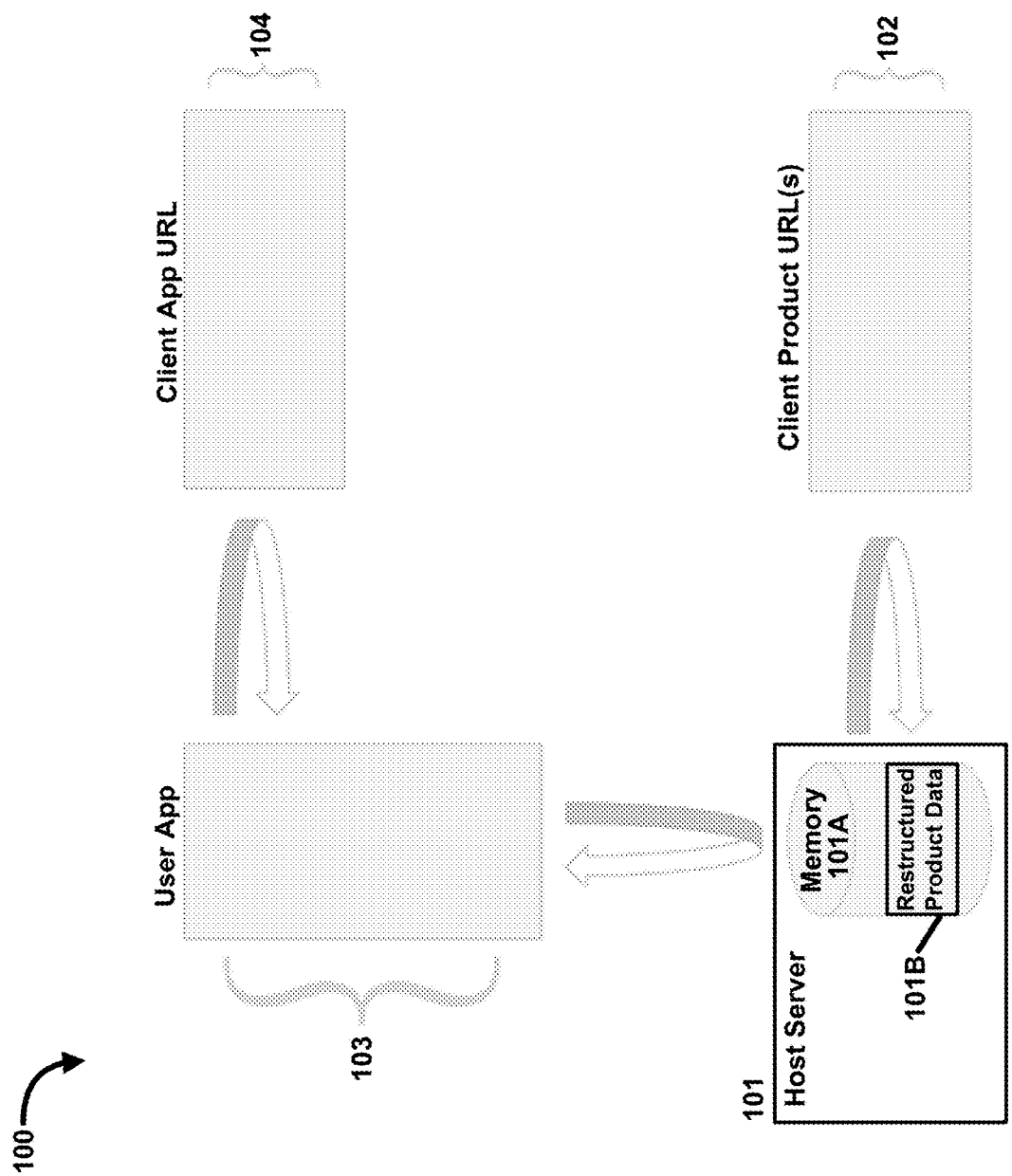
FIG. 1 is a diagram illustrating interaction between components of a system for collaborative instantiation of session objects and video-based remote modification thereof, according to some embodiments.

When using social media or navigating the Internet (e.g., on a mobile device), users generally encounter a wide variety of content, including advertisements and organic content. Such content can be posted on websites or accessed by the users within a software application ("app") running on a compute device of the user (e.g., a mobile device). While visiting a webpage (e.g., a social media webpage) or running an app (e.g., a social media app), a user can be presented with an option to click on (or otherwise select, e.g., by "swiping up") a "call-to-action," such as "Shop Now" or "Learn More." In response to making such a selection, the user is typically redirected from their existing environment (also referred to herein as a "primary environment") to a secondary environment via a web address or "Destination Uniform Resource Locator ("URL"), for example associated with a "landing page." The secondary environment can be a webpage of a third party (e.g., a retailer). For example, a retailer website "Gap.com" can include a landing page associated with a seasonal promotion at http://gap.com/seasonal-promotion, and/or a landing page associated with a specific product category (men's denim jeans) at http://gap.com/mens-denim-jeans.

Unfortunately, once users are presented with the new destination environment, they often exhibit low engagement with, and quickly navigate away from, the secondary environment (e.g., by returning to the primary environment), for example without making a purchase. This difficulty in retaining users in the new destination environments can be referred to as a "high abandonment rate," and may be due to one or more of the following problems:

- A secondary environment can have a "look and feel" that is substantially different from the primary environment in which the user was previously browsing/navigating. This visual disconnect and inconsistency can be negatively perceived by users as abrupt.
- The load time of the secondary environment can be undesirably slow.
- Secondary environments typically include static text and imagery, but no video content, and therefore may be less engaging than the primary environment from which the users arrived.
- "Add to cart" functionality is often obscured within the secondary environment, not made prominent in the secondary environment, or accessible only through multiple navigation/click steps in the secondary environment.
- When a user does select items and add them to a shopping cart in the secondary environment, the user often cannot subsequently readily access the product data (e.g., product description) or information (e.g., quantity of items) associated with their cart.
- Landing pages are typically limited to functionality within a single environment.
- Landing pages are typically limited to integration with a single shopping cart, or alternatively add selected items to a "list" for later purchase, instead of generating a shopping cart.

Elaborating on the first problem listed above, typically, when viewing a retailer's INSTAGRAM story or Snapchat ad (often for purposes of entertainment), a user is prompted to "swipe up" to purchase an item that appears in the INSTAGRAM story or Snapchat ad. The swipe typically directs the user to the item's product webpage where the user can buy it. However, it has been reported that retailers are observing user "bounce rates" (i.e., rates at which users abandon the product webpages to which the users are redirected) of around 90% after the users swipe up from the retailers' stories, and conversion rates (referring to the percentage of website visitors that complete a desired goal, such as a purchase). This is believed to be due, at least in part, to the degree to which the user's entertainment is interrupted (i.e., they are mentally removed from the entertainment mindset) when they are navigated to the ad.

Moreover, known shopping cart implementations are generally either platform-specific or retailer-specific. Platform-specific systems exist solely within a given platform. To feature products in platform-specific tools, a client actively catalogues their products on that specific, supported platform. Retailer-specific systems are exclusive to the retailer in question (e.g., to the retailer's website), and support only products that are defined within that infrastructure.

Embodiments of the present disclosure address some or all of the problems discussed above (while retaining desired functionalities such as "swipe up" navigation), for example by improving the transition from the primary environment to a new environment (referred to herein as a "curated destination environment," or "CDE"), so as to increase the retention rates of users (and/or to increase the associated conversion rates) within the curated destination environment. For example, upon swiping up (or otherwise making a selection within a primary environment), a user can be redirected to a curated destination environment at a URL of a host system of the present disclosure (e.g., https://attach-.mikmak.tv/ID-OF-BRAND-VIDEO-UNIT). The curated destination environment loads in the user's compute device with a faster load time than previous methods, and is presented to the user in a manner and/or format that is substantially visually consistent (e.g., substantially similar look and feel) with the primary environment The curated destination environment can be a landing page with full-screen video content, to engage the user from the moment they are presented with the curated destination environment. "Add to Cart" functionality can be prominently featured within the curated destination environment. The Add to Car feature can be selected by the user, so as to "remotely" add an item to a shopping cart session hosted on a third party's (e.g., a retailer's) compute device. In other words, the user can populate a shopping cart at a time when that user is viewing content hosted by the host server, and not within a retailer's shopping environment. Over time, the host system can gather/capture and store transaction information, for example including products and/or services users have added to shopping carts, how many times these items were added to shopping carts, etc. In some implementations, a processor of the host system can generate statistical information based on the transaction information and, optionally, can provide the statistical information to one or more third parties (e.g., to retailers).

Embodiments of the present disclosure can be re-used and/or run within a wide variety of native social media environments (such as INSTAGRAM, Snapchat, Facebook, or Twitter), potentially saving clients substantial time and resources. Embodiments of the present disclosure can also be retailer-agnostic, in that they can be made compatible with any retailer/client environment (e.g., website or app), regardless of which tool(s) the retailer/client uses to sell their products online. Moreover, embodiments of the present disclosure can include remote add-to-cart technology, by which a user can cause remote instantiation and/or population of a shopping cart session on a retailer/client website, while remaining in (e.g., continuing to navigate within or view a video within) a curated destination environment of a host server that is physically remote from the retailer/client server(s). In some implementations of the present disclosure, shopping cart sessions can be platform-agnostic and/or retailer-agnostic (i.e., compatible across all platforms and/or retailers).

Embodiments of the present disclosure present multiple additional advantages and improvements over existing technologies. For example, data structures having restructured, or "normalized," product metadata and/or service metadata are generated, stored, and used by the host system to ensure consistency across advertised products and/or services from disparate retailers. Curated destination environments (e.g., landing pages) generated by systems of the present disclosure are compatible with multiple different apps (e.g., multiple different social media apps, such as INSTAGRAM, Snapchat, Twitter, and/or Facebook). Curated destination environments (e.g., landing pages) generated by systems of the present disclosure can accommodate multiple remote shopping carts (e.g., each remote shopping cart being associated with a different retailer of multiple retailers), also referred to herein as a "multicart" implementation. Also, load times for the curated destination environments can be significantly shorter than those of known systems, since the curated destination environments of the present disclosure do not gather product metadata (and/or service metadata) from retailer websites in real time. Rather, product metadata (and/or service metadata) is accessed/retrieved by the host system from a local repository (e.g., a memory storage of the host system) in which normalized versions of all product metadata (and/or service metadata) referenced by the minimercials are stored. As used herein, "product" can refer to a product and/or a service.

According to some embodiments, systems and methods of the present disclosure facilitate (1) the creation and population of a virtual shopping cart on a remote retailer site in response to (and substantially concurrently with) user interactions with a video, and (2) the navigation of the shopper to the shopping cart on the remote retailer's website for completion of a purchase and/or alteration of the shopping cart contents. For example, a user may navigate to a curated destination environment of the host system (e.g., as a consequence of "swiping up" within an INSTAGRAM story). Upon "landing" within the curated destination environment (i.e., upon rendering on a screen of the shopper's compute device of the curated destination environment content associated with a URL), a video begins to play. Within the video, high level product and/or service details can be presented. One or more user-selectable objects (e.g., buttons) can then be viewable to the shopper (e.g., marked "Add to Cart on Retailer").

Systems of the present disclosure can facilitate transactions that originate at a retailer's presence within a primary environment (e.g., a daily story on INSTAGRAM or other social media application native to a mobile device) and terminate with the purchase, at a retailer's website, of a product available for sale on the retailer's website. The transactions can be facilitated by a user's interaction with a curated destination environment after the user engages with the primary environment, and before the user engages with the retailer's website. For example, in some implementations, users can swipe up within the primary environment (e.g., an INSTAGRAM story) and "land" in an interactive curated destination environment that can include an entertaining infomercial or sequenced assortment of minimercials (i.e., short form videos that concisely/efficiently describe benefits or features of a product). Minimercials can be informational advertisement videos of limited duration and/or associated with products and/or services of a predetermined sales price (e.g., $100 or less)) related to products and/or services that the shopper may desire to buy. Shoppers can choose to make product selections within the curated destination environment (e.g., by clicking, tapping, sliding, or otherwise interacting with a button or other GUI object) to add product(s) and/or service(s) to a shopping cart of an associated retailer, and/or can advance through the sequenced assortment of minimercials (e.g., by tapping the screen at a predefined location) to view additional products and/or services offered by the same retailer.

In some embodiments, a host server of the present disclosure gathers content (e.g., video, graphics, text, and/or other data) from a client's web-based store, identifies one or more products and/or services of the client's web-based store, associates the one or more identified products and/or services with a video file, and generates a "product information layer" for overlaying on the video file.

In some implementations, a host server of the present disclosure can process video content, e.g., so as to optimize the video content for viewability over a mobile internet connection and/or to optimize the video content for a specific shopper (e.g., to remove restricted content, to apply preferences, and/or the like), prior to displaying it to a shopper within the curated destination environment. Processing the video content can be based on historical data stored in a data storage/memory of the host server. By way of non-limiting example, in some implementations, processing a video is performed by running the video through a script. The script can modify the dimensions of the video (e.g., make it smaller) and/or reduce a frame rate of the video, resulting in a file size that is much smaller than the original size while substantially retaining its appearance when presented/displayed to a user. As such, the processed video can load at a faster rate (i.e., with an increased speed), for example over mobile Internet, thereby balancing/optimizing quality and speed. Such features also provide improvements (i.e., reductions) to bandwidth requirements, and can reduce the amount of processing power and/or processing time required.

As used herein, "look and feel" can refer to distinctive or noticeable design aspects of a website or software interface, including aspects of GUIs as well as non-graphical user interfaces. Look and feel can be associated with one or more of: colors, shapes, layout, font, typefaces, or behavior of elements (e.g., buttons, boxes, menus, widgets, etc.). For example, in some implementations, the curated destination environment is configured to automatically adapt to the environment in which or from which it is presented, for example by modifying colors, shapes and/or user interface ("UI") elements, to match those of the environment, such that the user does not perceive that they have left the environment/application they are browsing from.

As used herein, a "user" is an end user (often a consumer) who is visiting a webpage and/or using an app on which a call-to-action is presented. Once a user selects the call-to-action and is redirected to the curated destination environment, the user can be referred to as a "shopper." A "client" is an institutional user of the systems and methods set forth herein. For example, a client can be a retailer or merchant that performs marketing functions using the systems and methods set forth herein. Clients can perform setup functions, via communication with the host server, to connect or link the client's products and/or services to one or more video files (e.g., to one or more minimercials of a sequenced assortment of minimercials), thereby generating the curated destination environment content. Shoppers can make product and/or service selections from within the curated destination environment while viewing the minimercial content, and the host server coordinates the instantiation of one or more shopping carts at one or more servers of the clients that are associated with the selected product(s) and/or service(s).

As used herein, a "shopping cart" (or "virtual shopping cart") is an electronic commerce (e-commerce) related software that, in use, generates a temporary repository to which products and/or services selected (e.g., via a website or app) by online or app-based shopping customers ("shoppers") can be assigned, and in which such selected products can accumulate until an eventual purchase of the accumulated products and/or services is made by the shopper. Shopping cart software is generally stored on a server that hosts the website on which the shopper makes the eventual purchase, or on a server that is in communication with the server hosting such a website. Shopping cart software can be configured to capture payment information from a shopper and/or to interact with a secure gateway provider to conduct secure online credit card transactions. Shopping cart software can be implemented using Hypertext Transfer Protocol ("HTTP") cookies or query strings. Shopping cart software can also be at least partially implemented in HTML code on the website. In a server-based shopping cart implementation, data related to the shopping cart is typically stored in a session object, and can be dynamically accessed and manipulated (i.e., "on the fly") as the shopper adds, removes, or changes quantities of the products and/or services in the shopping cart. Data associated with the selected products and/or services (e.g., descriptions, categories, discounts, etc.), orders, and/or shoppers can be stored in a database of the server hosting the website and accessed in real time by the shopping cart software.

In some embodiments, upon a shopper's input of an indication of a desire to add a product and/or service to the shopping cart (e.g., by tapping "Add to Cart"), the shopper may be given a choice as to whether to add the product and/or service to one of multiple retailers' carts (for example, when the product and/or service is available from multiple retailers). Example code for collecting product data and, when prompted (e.g., in response to a user selection made via the curated destination environment), sending it to a client for instantiation of a shopping cart session, is as follows:

```
const IFRAME_ID = 'iframe-cart-holder'
const IFRAME_WRAPPER_ID = 'iframe-cart-holder'
const BUTTON_ID = 'iframe-cart-button'
import utils from '../services/utils'
import eventDispatcher from '../events/dispatch'
import utmParameterHelper from '../services/utmParameterHelper'
import cartManagerRequests from '../services/cartManagerRequests'
import store from '../store'
const STATE = store.state
let buttonHolder
let iframeHolder
let iframeIsLoading
let formHolder
const currentFocusedProduct = ( ) => STATE.currentFocusedProduct
const selectedPrimaryOption = ( ) => STATE.selectedPrimaryOption
const selectedSecondaryOption = ( ) => STATE.selectedSecondaryOption
const currentPlayer = ( ) => STATE.currentPlayer
const cartLink = ( ) => {
   if (currentFocusedProduct( ).cartLink) return
currentFocusedProduct( ).cartLink
   return currentPlayer( ).cartLink
}
const isTargetCart = ( ) => utils.cartPlatformCheck('target', STATE)
const isBoseCart = ( ) => utils.cartPlatformCheck('bose', STATE)
const isWalmartCart = ( ) => utils.cartPlatformCheck('walmart', STATE)
const isAmazonCart = ( ) => utils.cartPlatformCheck('amazon', STATE)
const isDollarShaveCart = ( ) => utils.cartPlatformCheck('dollarshave', STATE)
const goToTargetUrl = ( ) => goToUrl('https://www-secure.target.com/co-cart')
export default {
   create( ) {
      if (iframeIsLoading) return setTimeout(( ) => this.create( ), 1000)
      let product = currentFocusedProduct( )
      if (!product) return
      let wrapper = getAndClearIframeWrapper( )
      let iframe = getAndAppendIframe(wrapper)
      let body = getIframeBody(iframe)
      let firstOpt = selectedPrimaryOption( )
      let secondOpt = selectedSecondaryOption( )
      let form = createIframeForm(product, firstOpt, secondOpt)
      body.appendChild(form)
   },
   submitForm( ) {
      iframeIsLoading = true
      buttonHolder.click( )
      iframeHolder.onload = ( ) => {
         iframeIsLoading = false
      }
   },
```

```
    goToCart(eventOptions) {
      // Don't checkout if items are still loading.
      if (iframeIsLoading || window.addingBoseProducts ||
window.addingTargetProducts) {
        return setTimeout(( ) => this.goToCart(eventOptions), 500)
      }
      eventDispatcher('checkoutNow', eventOptions, ( ) => {
        window.checkoutInitiated = true
        if (currentPlayer( ).cartLinkOverride) {
goToUrl(utmParameterHelper.attachRequiredUtmParameters(currentPlayer( ).
cartLinkOverride, currentPlayer( )))
          return
        }
        if (isAmazonCart( )) return
cartManagerRequests.addToAmazonCart(formHolder)
        if (isWalmartCart( )) return cartManagerRequests.goToWalmartUrl( )
        if (isTargetCart( )) return goToTargetUrl( )
        if (isDollarShaveCart( )) {
goToUrl(utmParameterHelper.attachRequiredUtmParameters(formHolder.actio
n, currentPlayer( )))
          return
        }
        // Special case for Exact fit.
        if (window.exactFitUrl) {
goToUrl(utmParameterHelper.attachRequiredUtmParameters(window.exactFitU
rl, currentPlayer( )))
          return
        }
goToUrl(utmParameterHelper.attachRequiredUtmParameters(cartLink( ),
currentPlayer( )))
      })
    },
    shopNow( ) {
      let player = currentPlayer( )
      let url = player.offerLink || player.cartLink
      goToUrl(utmParameterHelper.attachRequiredUtmParameters(url,
currentPlayer( ) ) )
    },
    getIframeForm( ) {
      return formHolder
    },
    goToTargetUrl: goToTargetUrl
  }
  const goToUrl = (url) => window.top.location = url
  const getAndClearIframeWrapper = ( ) => {
    let wrapper = document.getElementById(IFRAME_WRAPPER_ID)
    wrapper.innerHTML = ''
    return wrapper
  }
  const getAndAppendIframe = (wrapper) => {
    let iframe = document.createElement('iframe')
    iframe.id = IFRAME_ID
    iframe.name = IFRAME_ID
    iframe.className = IFRAME_ID
    iframe.style.width = '0px'
    iframe.style.height ='0px'
    wrapper.appendChild(iframe)
    iframeHolder = iframe
    return iframe
  }
  const getIframeBody = (iframe) => {
    let doc = iframe.contentDocument || iframe.contentWindow.document
    return doc.body
  }
  const createIframeForm = (product, primaryOption, secondaryOption) => {
    let form = document.createElement('form')
    let formAction
    if (product.cartMetadata) formAction =
product.cartMetadata.addToCartUrl
    // AMAZON NOTE
    // This line sends them to Amazon Add to Cart Page.
    if (product.amazonLink) formAction = product.amazonLink
    // Alternately, send them to the product page
    // if (product.amazonLink && product.productUrl) formAction =
product. productUrl
    // END AMAZON NOTE
    if (primaryOption && primaryOption.setAddToCartUrl) formAction =
primaryOption. setAddToCartUrl
```

```
    if (secondaryOption && secondaryOption.setAddToCartUrl) formAction =
secondaryOption. setAddToCartUrl
       form. action = formAction
       form.method = 'POST'
       let hiddenInputs
       if (product && product.cartMetadata &&
product.cartMetadata.hiddenInputs) {
          hiddenInputs = product.cartMetadata.hiddenInputs
       }
       if (primaryOption && primaryOption.setHiddenInputs) hiddenInputs =
primaryOption.setHiddenInputs
       if (secondaryOption && secondaryOption.setHiddenInputs) hiddenInputs
= secondaryOption.setHiddenInputs
       if (hiddenInputs) {
          hiddenInputs.map((hiddenInput) => {
             let input = document.createElement('input')
             input.type = 'hidden'
             for (let key in hiddenInput) {
                input [key]= hiddenInput[key]
             }
             form.appendChild(input)
          })
       }
       let button = document.createElement('button')
       button.id = BUTTON_ID
       button.type = 'submit'
       buttonHolder = button
       form.appendChild(button)
       formHolder = form
       return form
    }
```

Example code for handling the state of the local representation of the shopping cart session within the curated destination environment ("cart manager" functionality), is as follows:

```
    import iframeForm from './iframeForm'
    import store from '../store'
    const STATE = store.state
    import utils from '../services/utils'
    import eventDispatcher from '../events/dispatch'
    import requests from './cartManagerRequests'
    export default {
       cartHandler( ) {
          if (!addToCartCanContinue( )) {
             store.commit('setShowOptions', true)
             return
          }
          addToCart( )
       }
    }
    const addToCartCanContinue = ( ) => {
       if (productHasOptions( )) {
          if (!requiredPrimaryOptionSelected( ) | |
!requiredSecondaryOptionSelected( )) {
             return false
          }
       }
       return true
    }
    // Add item to cart and set state.
    const addToCart = ( ) => {
       addedToCartState( )
       if (isWalmartCart( )) return
requests.addToWalmartCart(iframeForm.getIframeForm( ), afterAddToCart)
       if (isAmazonCart( )) return afterAddToCart( )
       if (isDollarShaveCart( )) return afterAddToCart( )
       if (isBoseCart( )) return
requests.addToBoseCart(iframeForm.getIframeForm( ))
       if (isTargetCart( )) return
requests.addToTargetCart(currentFocusedProduct( ),
iframeForm.getIframeForm( ), afterAddToCart)
```

```
    // HACK: this is the last brand-specific work we're going to do here.
Our
    // upcoming pivotal task is going to add an 'addToCartType'on
brands,
    // deprecating this type of ugly code.
    if (currentFocusedProduct( ).cartPlatform == 'exact-fit-shop') {
        let action = iframeForm.getIframeForm( ).action
        window.exactFitUrl = action
        return
    }
    if (currentFocusedProduct( ).cartPlatform == 'nike-test') {
        let action = iframeForm.getIframeForm( ).action
        document.getElementById('nike-test-iframe').src = action
        return
    }
    if (currentFocusedProduct( ).cartPlatform == 'sephora') {
        let action = iframeForm.getIframeForm( ).action
        let newIframe = document.createElement('iframe')
        newIframe.src = action
        newIframe.height = '0px'
        newIframe.width = '0px'
        newIframe.style.display = 'none'
        document.body.appendChild(newIframe)
        return
    }
    iframeForm.submitForm( )
}
const afterAddToCart = ( ) => {
    if (currentPlayerType( ) == 'multicart') {
        if (isAmazonCart( )) return iframeForm.goToCart({ cart_retailer:
'amazon' })
        if (isWalmartCart( )) return iframeForm.goToCart({ cart_retailer:
'walmart' })
        if (isTargetCart( )) return iframeForm.goToCart({ cart_retailer:
'target' })
    }
    if (isAmazonCart( )) return iframeForm.goToCart( )
    if (isDollarShaveCart( )) return iframeForm.goToCart( )
}
// State settings for add to cart.
const addedToCartState = ( ) => {
    // Handle the Add to Cart event in amplitude.
    let eventOptions
    let multicartRetailer =STATE. currentMulticartRetailer
    if (multicartRetailer) eventOptions = { cart retailer:
multicartRetailer }
    eventDispatcher('addToCart', eventOptions)
    // Hide options, they may be visible.
    store.commit('setShowOptions', false)
    // Make sure item is visually added to cart.
    store.commit('addItemToCart', 'item')
    // Change state to Added to Cart state.
    store.commit('setAddedToCartState', true)
    setTimeout(( ) => store.commit('setAddedToCartState', false), 3500)
    // Checkout automatically happens in multicart. Stop changing state
and
    // redirect in this case.
    if (currentPlayerType( ) == 'multicart') return
    // Amazon "Add to Cart" is an implicit checkout. Maintain current
state
    // when a user clicks ATC with a Amazon product.
    if (isAmazonCart( )) return
    // Reset several state variables for standard formats.
    store.commit('setCheckoutButton', true)
    store.commit('setSelectedPrimaryOption', undefined)
    store.commit('setSelectedSecondaryOption', undefined)
    store.commit('setChildOptionsForPrimaryOption', undefined)
}
const currentPlayer = ( ) => STATE.currentPlayer
const currentProducts = ( ) => STATE.currentPlayerProducts
const currentFocusedProduct = ( ) => STATE.currentFocusedProduct
const currentPlayerType = ( ) => STATE.currentPlayerType
const isTargetCart = ( ) => utils.cartPlatformCheck('target', STATE)
const isBoseCart = ( ) => utils.cartPlatformCheck('bose', STATE)
const isWalmartCart = ( ) => utils.cartPlatformCheck('walmart', STATE)
const isAmazonCart = ( ) => utils.cartPlatformCheck('amazon', STATE)
const isDollarShaveCart = ( ) => utils.cartPlatformCheck('dollarshave',
STATE)
```

```
        const productHasOptions = ( ) => {
            let product = currentFocusedProduct( )
            if (!product) return false
            if (product.optionData) {
                if (product.optionData.primary) return true
            }
            return false
        }
        const selectedPrimaryOption = ( ) => STATE.selectedPrimaryOption
        const selectedSecondaryOption = ( ) => STATE.selectedSecondaryOption
        const requiredPrimaryOptionSelected = ( ) => {
            let product = currentFocusedProduct( )
            if (!product) return true
            if (!product.optionData) return true
            if (product.optionData.primary) {
                if (!selectedPrimaryOption( )) return false
            }
            return true
        }
        const requiredSecondaryOptionSelected = ( ) => {
            let product = currentFocusedProduct( )
            if (!product) return true
            if (!product.optionData) return true
            if (product.optionData.secondary) {
                if (!selectedSecondaryOption( )) return false
            }
            return true
        }
        const multiItemStore = ( ) => currentPlayerType( ) == 'store' &&
        currentProducts && currentProducts.length > 1
        const singleItemStore =0+ ( ) => currentPlayerType( ) == 'store' &&
        currentProducts && currentProducts.length == 1
```

In some implementations, the curated destination environment includes graphical representations of interactive objects (e.g., buttons) for the selection/modification of one or more of: video sound (e.g., "ON," "OFF," volume adjustment, etc.), additional product data, product imagery, etc. The presence or absence of such interactive objects can vary as a shopper interacts with the curated destination environment. For example, when user clicks "Add to Cart," and a shopping cart is instantiated, and an associated item or items is placed into that shopping cart. Once the item or items are added to the shopping cart, one or more new interactive objects (e.g., a "Checkout" or "View Cart" button) can be rendered within the curated destination environment, thus allowing user to navigate to and view their shopping cart. To instantiate the shopping cart, product metadata previously collected from and restructured/normalized by the host server can be sent from the host server to a third party server (e.g., the remote retailer/merchant server associated with the selected product(s)) while the user remains within the curated destination environment. The product metadata is programmatically represented in a manner that is consistent across multiple different retailer sites, such that the instantiation, by the host system, of multiple shopping carts at multiple different retailer sites can likewise be performed in a consistent way.

In some embodiments, a method for facilitating video-based remote shopping cart generation includes the collection, at a host server, of product metadata from multiple disparate third-party entities or nodes (e.g., via multiple different retailer websites). Subsequently, a user viewing a website or app can make a selection (e.g., a "swipe up" selection from within an INSTAGRAM story) to be routed from a primary environment (e.g., INSTAGRAM) to a curated destination environment. For example, a browser of the user's mobile device may navigate to a Destination URL associated with the host server, in response to the "swipe up" command. Within the curated destination environment, the user/shopper is presented (i.e., via a GUI of the user's compute device, such as a mobile device) with interactive video content that includes a user-selectable object (e.g., labelled "Add to Cart") having functionality to add a selected product to a remote shopping cart.

Although a curated destination environment is shown and described herein as accessed/accessible via social media platforms and interfaces (e.g., as a miniature web app distributed over a URL), in other implementations, the curated destination environment can be embedded within, and accessed/accessible from other media such as: a static web page (e.g., viewable upon arrival/landing at the web page, or viewable after navigating or scrolling within the web page to a location where the CDE is presented), a video residing within a web page, an advertisement residing within a web page, an advertisement residing within or accessed via a social media platform, a video game, an email, etc.

Embodiments of the present disclosure can be fully or substantially fully platform-agnostic, in that systems of the present disclosure can be compatible with any external e-commerce platform, shopping cart, and/or social/advertising network.

In some embodiments, an implementation of the disclosure can be configured to allow clients to present their video content to a user of the applications mentioned above, as well as to enhance said videos by making them "shoppable." According to some embodiments, videos are made shoppable by connecting/integrating the disclosed technology to the technology used by clients. By connecting, overlaying, or "attaching" their products and videos to one another using the disclosed technology, 'instances' of a curated destination environment can be created. For instance, a client might choose to add a curated destination environment to their social media profile page or feed, feature it on their website, or embed it within an article (e.g., a fashion magazine website or news website), for example as shown and described with reference to FIG. 6 below.

In some embodiments, application and setup of a curated destination environment begins with a client connecting to a host server of the present disclosure by logging into a platform (e.g., a MikMak platform), for example as shown and described with reference to FIGS. 4 and 5, below. Next, the client can select or specify the products they would like to feature, and associate the specified products (optionally together with promotions or any other content they want to feature) to one or more videos. Still within the platform, clients can create new curated destination environment instances, and identify them as being "active" (e.g., accessible) or "inactive" (e.g., inaccessible) for specified users/shoppers in various ways. In some instances, such "permissioning" is performed collaboratively between the client, the host server, and one or more specific access points granted to the host server by other, third-party organizations). Data can be collected about all active curated destination environment instances as they are interacted with/used by users, and a client can view and/or retrieve the collected data to learn how the curated destination environment instances are performing within the platform.

In some embodiments, a curated destination environment instance is accessed and interacted with by a user of a compute device (e.g., a mobile device) that is connected to the Internet. The user may first be engaged with a primary environment (e.g., INSTAGRAM, a website, Facebook, Snapchat or Twitter). The access can be via a web-based app, or via an app that is stored locally on the compute device. When a user engages with content from one of the platform's clients, they can see a "call-to-action" displayed or a link that points to a curated destination environment instance. By clicking on the call-to-action or link, the user is directed/navigated to a URL associated with the curated destination environment instance. Once within the curated destination environment, the user/shopper can toggle through a set of videos, cause products featured in those videos to be added to a digital 'shopping cart' (without the user leaving the curated destination environment), access sound controls for the videos, toggle a product-information layer onto the video to cause the display of additional product information, and/or exit out of the curated destination environment and return back to the primary environment.

In some embodiments, a method and software system allows a user to trigger the addition of one or more products to a virtual shopping cart while the user continues watching video content (e.g., vertical video content, defined as video that is intended for viewing in portrait mode, producing an image that is taller than it is wide) within a curated destination environment. A shopping cart session can be instantiated (and a selected product added to the instantiated shopping cart) by a host server, which is in communication with an external client server/system (e.g., website) and/or third-party server system, in response to a product selection made by a user interacting with the curated destination environment. Additional products can be also added to the shopping cart by the host server in response to subsequent product selections made by the user within the curated destination environment.

In some implementations, a method for collaborative instantiation of session objects and video-based remote modification thereof includes running software scripts on the host server to automate the execution of a communication with the client's server (e.g., via the client's website), to extract product metadata and to gather information about the client's products. Next, the collected metadata is reconstructed/restructured, or normalized, on the host server (e.g., processed by a processor of the host server and stored within a memory/data store of the host server), to generate restructured product data having a uniform format. Signals encoding portions of the restructured product data can subsequently be sent to the client server in response to user/shopper selections made within the curated destination environment, to cause the instantiation of a shopping cart session. A confirmation message (e.g., including a "set cookie header") can then be sent to the host server from the client server, encoding an indication that the creation of the shopping cart session was successful. The user/shopper can then proceed to add additional products to the shopping cart (e.g., by making additional products selections via the video), and/or take action on the newly-created shopping cart, e.g., by navigating to the shopping cart (e.g., using a universal resource locator ("URL")), so as to view the shopping cart, modify the shopping cart, or purchase the contents of the shopping cart.

In some embodiments, the curated destination environment sends a request to a client server in response to a product selection made by a user interacting with the curated destination environment, to cause instantiation of a shopping cart (and addition of the selected product to the instantiated shopping cart). The client server sends a confirmation message in response to the request message. The confirmation message includes headers providing details such as success or failure of the request. For example, headers can include key value pairs, e.g., "status: 200," where "200" indicated that a status of the request is "successful." In some instances, the confirmation message includes a key value pair of "set-cookie: {cookieValue}," where "cookieValue" is information tying a shopping cart to a web browser. Upon receipt of a confirmation message including a set cookie header, a cookie is set at the host server. Subsequently, when a user of the curated destination environment makes a selection to navigate to their shopping cart (e.g., by pressing a "Go To Cart" button), the host server navigates to the URL associated with the shopping cart, and is recognized based on the cookie stored at the host server. The user may then view, edit and/or purchase items in the shopping cart. Alternatively or in addition, in response to the receipt of the confirmation message including a set cookie header at the host server, the host server causes a cookie to be stored at the mobile device of the user (i.e., the mobile device on which the user is interacting with the curated destination environment) such that when the user of the curated destination environment subsequently makes a selection to navigate to their shopping cart (e.g., by pressing a "Go To Cart" button), the user's mobile device (e.g., a browser thereof) navigates to the URL associated with the shopping cart, and is recognized based on the cookie stored on the mobile device. Under either of the foregoing scenarios, if the same web browser through which the user is interacting with the curated destination environment, and running on the same mobile device, subsequently visits the website belonging to the client server that originally sent the "set-cookie header," the web browser will be identified, and will be presented with the shopping cart created by the request.

In some embodiments, the shopping cart "resides" on (or is hosted by) a retailer website that is different from the site the user is on, or that is different from the site that is hosting the application. The shopping cart can be created by communication between the host server and the client's (e.g., retailer's) website, server, or API, for example by leveraging browser cookie technology and/or via the exchange of product metadata. In some instances, the product metadata is collected, previous to instantiation of the shopping cart, by the host server (e.g., from the client website) using a script that requests product page information from the client website. Once the product metadata has been collected and/or extracted by the host server, the product metadata is transformed, at the host server, into a standardized representation (i.e., restructured product data). The restructured product data can subsequently be retrieved (e.g., during an interaction between a user/shopper and the curated destination environment), in a manner that, to the inventors' knowledge, is not available in any other system. A user/shopper can enter a curated destination environment via a URL, and be presented with an application interface that includes a video with embedded or overlayed user-selectable objects or features, such as an "Add to Cart" button. When clicked/selected, the "Add to Cart" button triggers the collection and/or arrangement, at the host server, of the relevant restructured product data (i.e., the restructured product data associated with the user's selection), and the sending of the collected and/or arranged relevant restructured product data from the host server to a URL of the client's website (i.e., to a remote server associated with the client), so as to cause the instantiation of a shopping cart while the user is still viewing/interacting with the curated destination environment. Once the instantiation of a shopping cart has occurred (e.g., as may be indicated by a return/confirmation message (including a set cookie header), received at the host server from the client server, indicating a successful shopping cart creation), new user-selectable objects (e.g., buttons) can be rendered/displayed within the curated destination environment by which the user can navigate to a client URL representing their shopping cart. Once the user has navigated to the client URL, the user/shopper can view their shopping cart, modify the contents of their shopping cart, and/or checkout.

Although described herein to occur on a "client server," the instantiation of shopping carts by the host server can, alternatively or in addition, be performed on one or more third-party servers and/or multiple client servers (e.g., multiple retailers that may offer a common product).

System Interoperability Overview

Turning now to the figures, FIG. 1 is a diagram illustrating interaction between components of a system 100 for collaborative instantiation of session objects and video-based remote modification thereof, according to some embodiments. As shown in FIG. 1, a host server 101, including a memory 101A, is in operable communication with one or more client product URLs 102 (e.g., associated with a retailer), and configured to collect product metadata from the client product URL(s). The host server 101 is also configured to process the collected product metadata and modify it so as to generate restructured product data, which can be stored in memory 101A, at 101B. A user app 103, for example running on a client device of a user/shopper, is in operable communication with the host server 101, for example while a curated destination environment is presented to the user via the user app 103. When the user makes one or more product selections from within the curated destination environment, relevant restructured product data 101B can be retrieved by the user app 103 from the memory 101A of the host server 101, and sent from the user app 103 to a client app URL 104 (e.g., associated with the retailer), so as to cause instantiation of a shopping cart session, while the user app continues to display the curated destination environment to the user. The user can subsequently choose (e.g., via a user-selectable option rendered on a screen of the user's mobile device within the curated destination environment) to navigate to the client app URL to view, revise, and/or purchase the products in the shopping cart.

Figure 2:
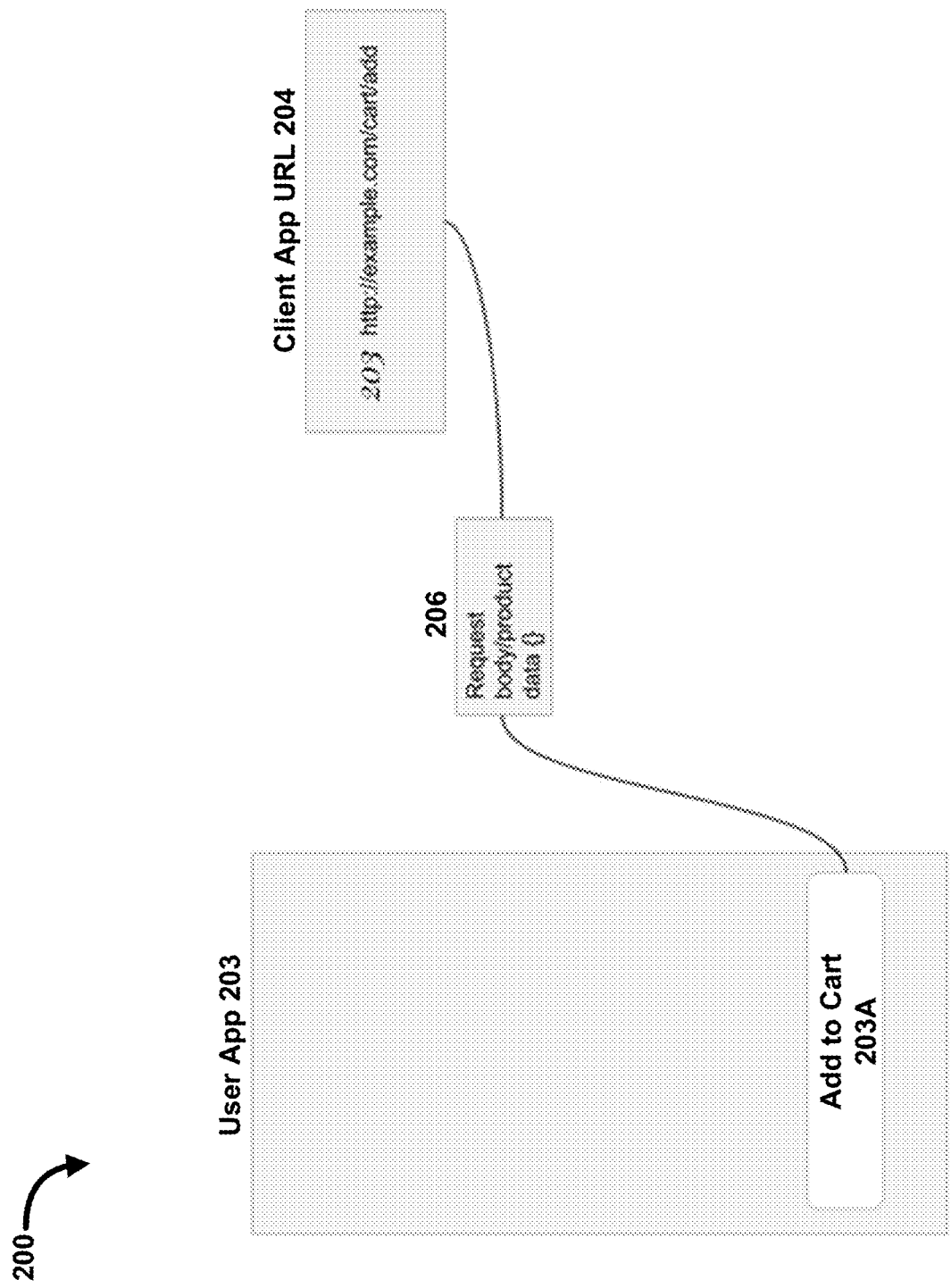
FIG. 2 is a diagram illustrating an "add to cart" function, according to some embodiments.

FIG. 2 is a diagram illustrating a system 200 having an "add to cart" function, according to some embodiments. As shown in FIG. 2, when an "Add to Cart" button 203A within the user app 203 (displaying the curated destination environment) is clicked (or otherwise selected), a request body 206 is generated and sent, as part of a request, to the client application URL 204 (e.g., http://example.com/cart/add) to trigger the instantiation of a shopping cart (in the event that the selection of the "Add to Cart" function is a first selection within a given curated destination environment session for that user) or to trigger the addition of one or more products to an already-existing/previously-instantiated shopping cart (i.e., for second and subsequent selections of the "Add to Cart" function within the given curated destination environment session for that user).

Product Metadata Collection

Figure 3:
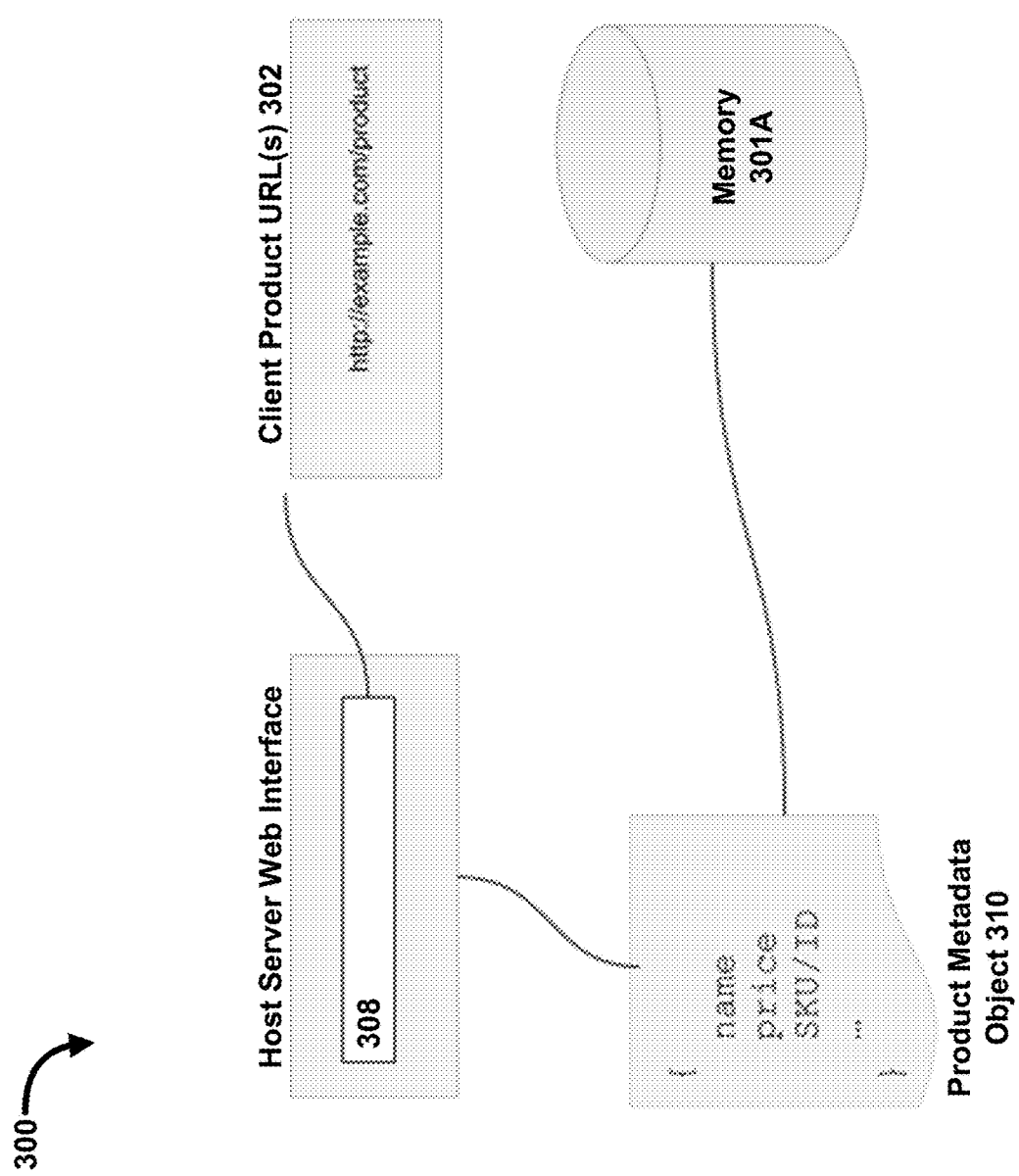
FIG. 3 is a diagram illustrating retrieval of product data from a disparate, remote software application, according to some embodiments.

FIG. 3 is a diagram illustrating retrieval of product data from a disparate, remote software application, according to some embodiments. The retrieval of product data can occur prior to a user's interaction with the curated destination environment. As shown in FIG. 3, product data from a client product URL 302 can be "ingested" by the host server (e.g., host server 101 of FIG. 1) through a web interface 308. Data passed to the host server via the web interface 308 is converted into a standardized data payload, or product metadata object 310. This data payload 310 is then stored in the memory 301A of the host server, and can subsequently be retrieved by the user app running the curated destination environment.

In some embodiments, product metadata collection is accomplished using a software-based data collection service of the host server, also referred to herein as 'productFromUrl'. This data collection service can be a Representational State Transfer (REST) application program interface (API), or "REST API," that is configured to accept HTTP Method token requests (e.g., "GET," "OPTIONS," HEAD," "POST," "PUT," DELETE," "TRACE," "CONNECT," etc.) and a single parameter "url," produce a restructured/normalized set of product data associated with the provided url parameter, and store that normalized data for later recall or retrieval from memory.

Below is an example request to the data collection service. The request can include two portions (1 and 2):

(1) Base URL: http://mikmak-microservices.appspot.com/productFromUrl?url=

(2) Product URL: https://www.amazon.com/Revlon-ColorStay-Exactify-Liquid-Intense/dp/B07599CB1X/ref=sr_1_1_a_it?ie=UTF8&qid=1516930490&sr=8-1&keywords=exactify The complete request (http://mikmak-microservices.appspot.com/productFromUrl?url=https://www.amazon.com/Revlon-ColorStay-Exactify-Liquid-Intense/dp/B07599CB1X/ref=sr_1_1_a_it?ie=UTF8&qid=15169304-90& sr=8-1&keywords=exactify) can return a payload in JavaScript Object Notation ("json") data format, representing a product in the normalized structure.

Figure 5:

A code snippet showing an example restructuring or normalization process that can be applied to collected product data, according to some embodiments, is as follows:

```
const slugify = (text) => {
  return text.toString( ).toLowerCase( )
    .replace(/\s+/g, '-')          // Replace spaces with -
    .replace(/[^\w\-]+/g, '')      // Remove all non-word chars
    .replace(/\-\-+/g, '-')        // Replace multiple - with single -
    .replace(/^-+/, '')            // Trim - from start of text
    .replace(/-+$/, '');           // Trim - from end of text
}
const dummyProductObject = ( ) => {
  return {
    'id': undefined,
    'SKU': undefined,
    'category': undefined,
``` vice) to the specified product URL, and, in response to the request, a return message sent back to the host server, the return message including product data (e.g., a product data "object," as shown in the right portion of FIG. 5). As shown in FIG. 5, the product data can include one or more of: product stock keeping unit (SKU) number, product category, URL for a shopping cart associated with the product, shopping cart metadata, shopping cart name, shopping cart platform, product description, product name, price, and/or product image(s).

A code snippet showing a further example of a collected product data object, retrievable using the productFromUrl function, is as follows:

```
"success": true,
"product": {
  "SKU": "8076245WRP",
  "category": "amazon",
  "description": "",
  "name": "Revlon ColorStay Exactify Liquid Liner",
  "slug": "revlon-colorstay-exactify-liquid-liner",
  "productUrl": https://www.amazon.com/Revlon-ColorStay-Exactify-
     Liquid-Liner/dp/B076245WRP?Subscription
     Id=AKIAIHF0WEA0E4ZS60GA&tag=mikmak09-
     20&linkCode=xm2&camp=2025&creative=165953&creativeASIN=B076245
     WRP,
  "cartPlatform": "amazon",
  "cartLink": https://www.amazon.com/gp/cart/view.html,
  "cartName": "Amazon",
  "cartMetadata": {
      "addToCartUrl":https://www.amazon.com/gp/aws/cart/add.html
          ?Access+Key+ID=AKIAI6XNLHWSKEN3STGQ&Associate+Tag=mik
          mak09-20&ASIN.1=B076245WRP&Quantity.1 =1&add=add\"
  },
  "product-images": [
     https://images-na.ssl-images-amazon.com/images/I/31dtQBU9n
        0L.jpg
  ],
  "optionData": { ▓ },
  "price": "11.99"
  }
}
```

-continued

```
    'description': undefined,
    'name': undefined,
    'price': undefined,
    'product-images': undefined,
    'options': undefined,
    'slug': undefined
  }
}
const getTextBetween = (text, startString, endString) => {
  let startPosition = text.indexOf(startString) + startString.length
  let endPosition = text.indexOf(endString, startPosition)
  let textBetween = text.substring(startPosition, endPosition);
  return textBetween.trim( );
}
module.exports = {
  slugify: slugify,
  dummyProductObject: dummyProductObject,
  getTextBetween: getTextBetween
}
```

Figure 4:
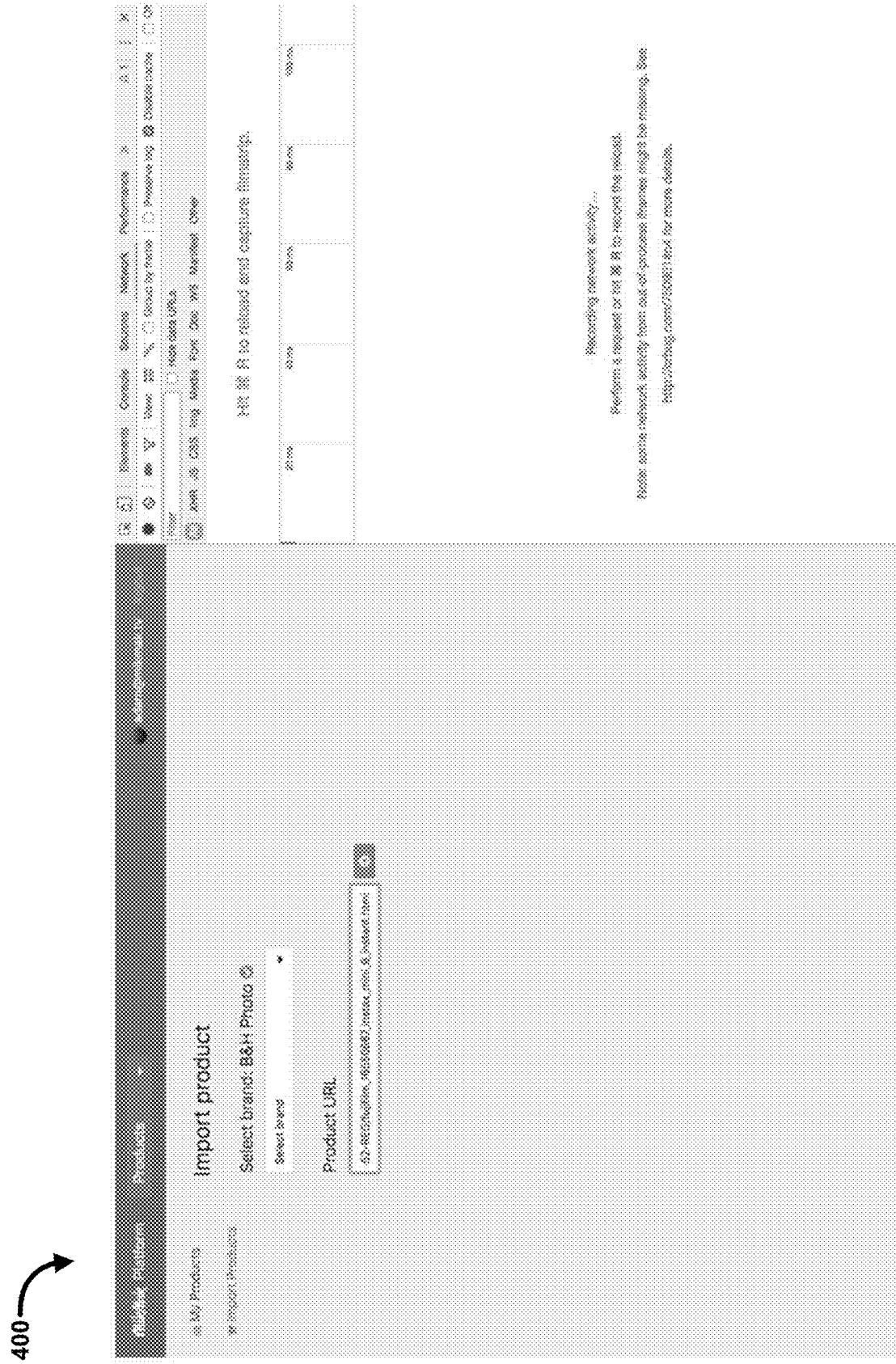
FIGS. 4-5 are screenshots illustrating a product metadata collection interface, according to some embodiments.

FIGS. 4-5 are screenshots illustrating a product metadata collection interface, according to some embodiments. More specifically, FIG. 4 is a screenshot 400 showing an "Import Products" view of a client interface of the host system, in which a user can paste a product URL. FIG. 5 is a screenshot 500 showing the Import Products view of the client interface of the host system after a client has selected the advance button (▓), triggering the sending of a request from the host server (e.g., using the productFromUrl collection service) to the specified product URL, and, in response to the request, a return message sent back to the host server, the In some embodiments, a product data object includes a cart metadata parameter ("cartMetadata") that includes information for generating a structured request that can be used to instantiate a shopping cart session (e.g., in response to a user selection made by a user within a curated destination environment). Alternatively or in addition, a product data object can include an option data parameter ("optionData") that represents multiple different options associated with a product, such as size and color. The option data parameter can be larger than the cart metadata parameter. The options associated with optionData can be represented as a matrix of identifiers associated with available product features, feature variants and/or combinations thereof, and can include indications as to whether certain features and/or combinations thereof are available or not available. Examples of product features include, but are not limited to, make, model, SKI, color, shape, size/dimensions, texture, finish, battery type, material, composition, concentration, etc. Example pseudo-code (javascript executable on a server) for product metadata collection and processing is as follows:

```
//URL is passed into service
//URL is a website address of a product page
let url=req.query.url
```

```
//Request the unstructured data based on product URL
request.get(url).then((productPageHtml)=>{
    let product={ }
    product.name=extractProductName(productPageHtml)
    product.cartMetadata=extractCartMetadata(product-
PageHtml)
    . . .
    //Respond to client with JSON data about product
    res.json({
    success: true,
    product: product
    })
})
//Client that requested data will then store this product data
and
//associate it with the client account.
```
Remote Add-to-Cart Functionality In some embodiments, a remote "add-to—cart" process works in collaboration with the product metadata collection described above. Once a product's metadata has been collected, restructured/normalized and stored, the option to "remotely" add that product to a digital shopping cart is made available. Example pseudo-code (javascript executable in a web browser/client) for a remote add-to-cart process is as follows:

```
//Get a product from database
let product=databaseService.getProductById(productId)
//Create a web form
let form=document.createElement('form')
form.type='POST'
//Action of form will be 'addToCartUrl' of product
form.action=product.cartMetadata.addToCartUrl
//Product will have properties to be added to form.
let productProperties=product.cartMetadata.hiddenInputs
//Iterate over the various properties, create hidden inputs,
//add them to form.
productProperties.map((property)=>{
    let input=document.createElement('input')
    input.type='hidden'
    input.name=property.name
    input.value=property.value
    form.appendChild(input)
})
//Append form to the page
document.appendChild(form)
//Now, when form is submitted, a shopping cart instance will
be
//created on a retailer/client site.
```

Figure 6:
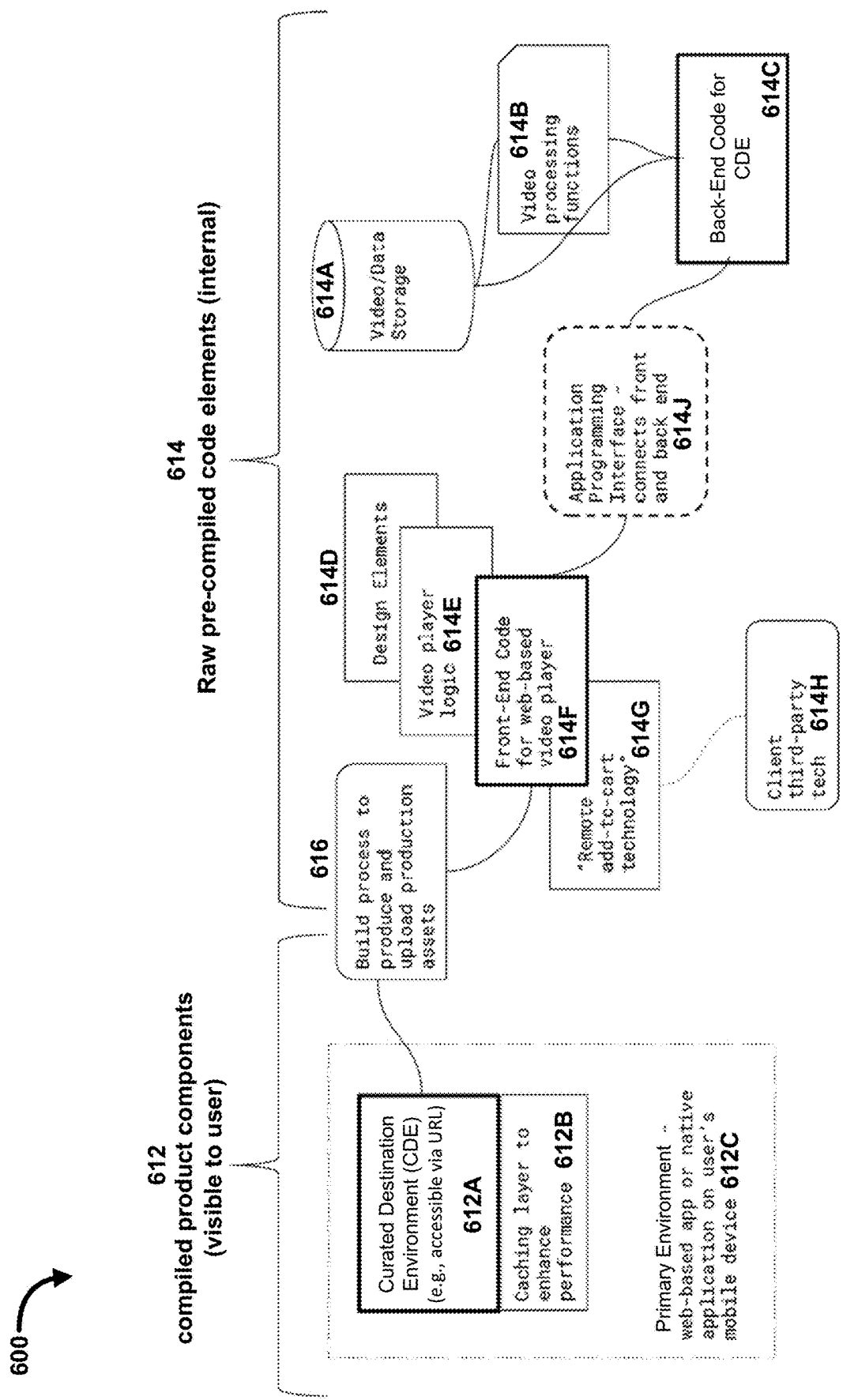
FIG. 6 is a diagram illustrating components of a system for collaborative instantiation of session objects and video-based remote modification thereof, according to some embodiments.

FIG. 6 is a diagram illustrating components of a system 600 for collaborative instantiation of session objects and video-based remote modification thereof, including remote add-to-cart technology, according to some embodiments. As shown in FIG. 6, certain pre-compiled elements of code (e.g., "raw" code elements) are internal to the system 600, and can include: video/data storage 614A (e.g., including video processing functions 614B and back-end code 614C for generating curated destination environments), design elements 614D, video player logic 614E, front-end code 614F for a web-based video player, remote add-to-cart technology 614G, and client third-party technology 614H. The front-end code 614F and back-end code 614C can be connected by an application programming interface (API) 614J. As also shown in FIG. 6, certain compiled product components are visible to a user of the system 600, and can include: the curated destination environment (e.g., accessible using a URL) 612A, a caching layer to enhance performance of the curated destination environment (e.g., to speed up or reduce latency in video playback) 612B, and a primary environment (e.g., a web-based app or native app on a user's mobile device) 612C via which a user can access the curated destination environment.

Figure 7A:
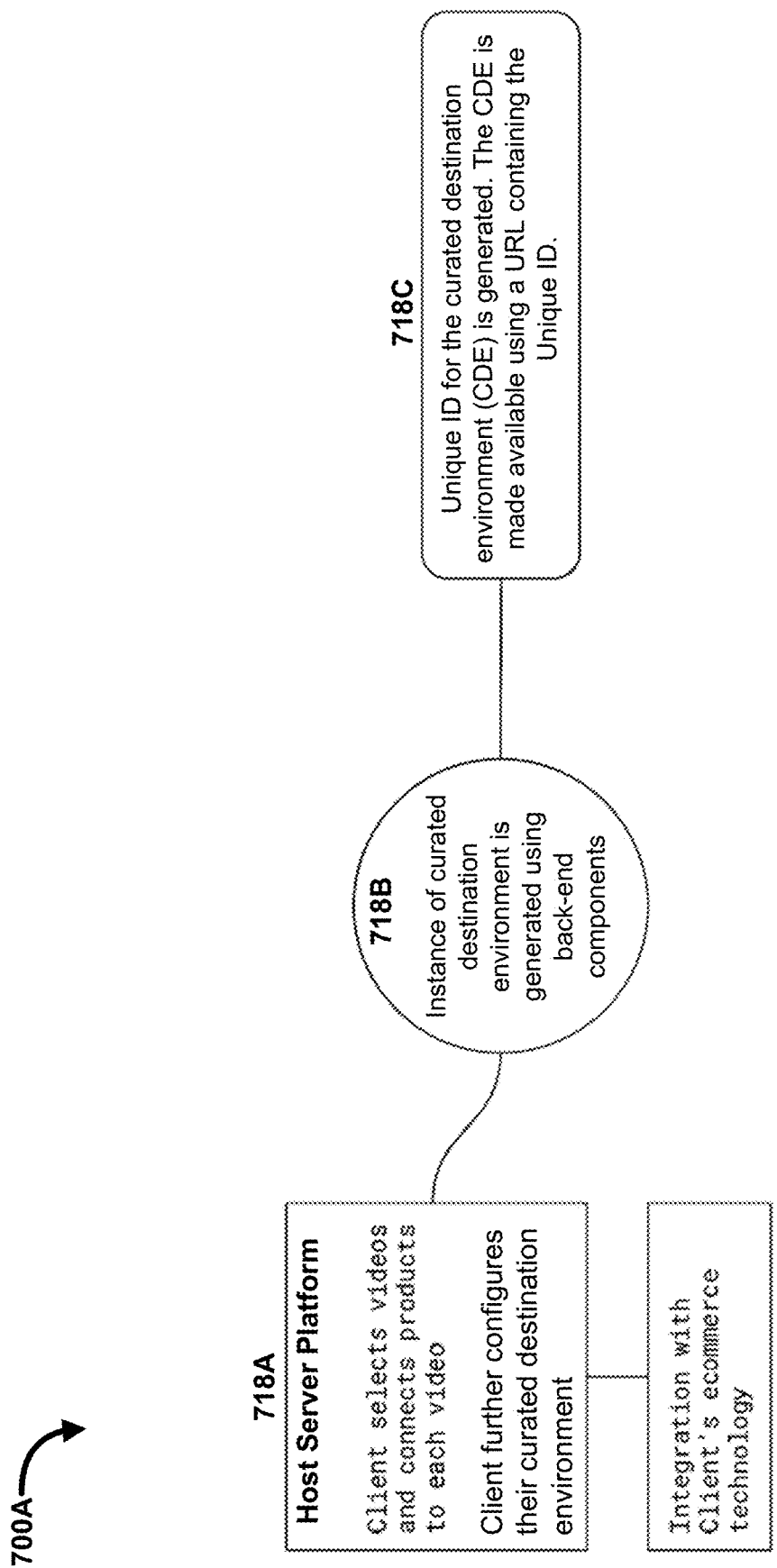
FIG. 7A illustrates an example client setup process flow, according to some embodiments.

FIG. 7A illustrates an example client setup process flow 700A, according to some embodiments. As shown in FIG. 7A, a client can make selections of videos and/or products to which the videos are to be associated, via a host server platform 718A and, optionally, makes further configuration decisions, e.g., a quantity and/or sequencing of videos and/or products that will appear in the CDE, whether a relationship between specified products and videos is direct (i.e., 1 to 1) or indirect (i.e., 1 to many), whether a user will be granted control over which retailer they purchase a selected product from, whether text-based elements are to include customized text, and/or other configuration details. The creation of curated destination environments can be integrated with the client's e-commerce technology (e.g., including website landing pages, social media websites and/or apps). In response to the client selections, an instance of a curated destination environment is generated (at 718B) using back-end components of the host system (e.g., as shown and described with reference to FIG. 6). A unique identifier ("ID") for the curated destination environment is generated at 718C, and the curated destination environment can subsequently accessed via a URL that includes the unique ID.

Figure 7B:
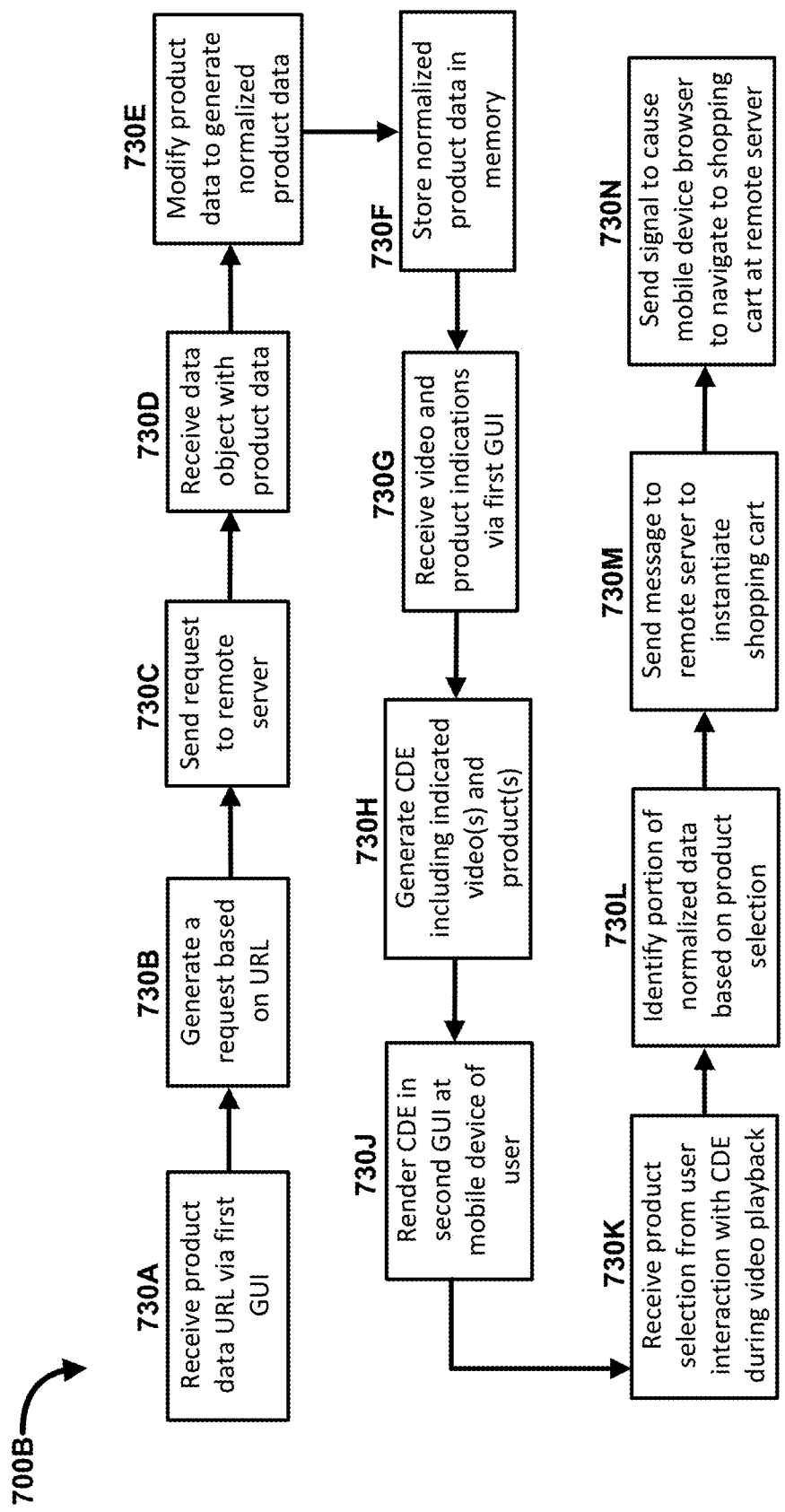
FIG. 7B illustrates an example client setup process flow, according to some embodiments.

FIG. 7B illustrates an example client setup process flow 700B, according to some embodiments. For an apparatus having at least one processor and a memory operatively coupled thereto, the processor can be configured to perform the operations shown in FIG. 7B. At 730A, a uniform resource locator (URL) associated with product data is received via a first graphical user interface (GUI) operably coupled to a host server. At 730B, a request based on the URL is generated via the host server, and sent, at 730C, to a remote server. A data object, including the product data, is received, at 730D, from the remote server and in response to the request. The product data is modified by the processor, at 730E, to generate normalized product data, and the normalized product data is stored in the memory at 730F. At 730G, an indication of a video and an indication of a product to be associated with the video are received via the first GUI. A curated destination environment ("CDE") is generated, at 730H, the CDE including the video and the selected product. At 730J, a signal is sent to render the CDE within a second GUI that is associated with a mobile device of a user. A message encoding a product selection is received, at 730K, at the host server during playback of the video and in response to a user interaction with the CDE. In response to receipt of the message encoding the product selection, a portion of the normalized product data associated with the product selection is identified (at 730L). At 730M, a message is sent to the remote server, the message including the identified portion of the normalized product data, to cause instantiation of a software shopping cart at the remote server. Subsequently, at 730N, a signal can be sent, in response to a user selection of a checkout object within the CDE, to cause a browser of the mobile device of the user to navigate to the software shopping cart at the remote server. In some such embodiments, the CDE does not include a shopping cart instance.

Figure 7C:
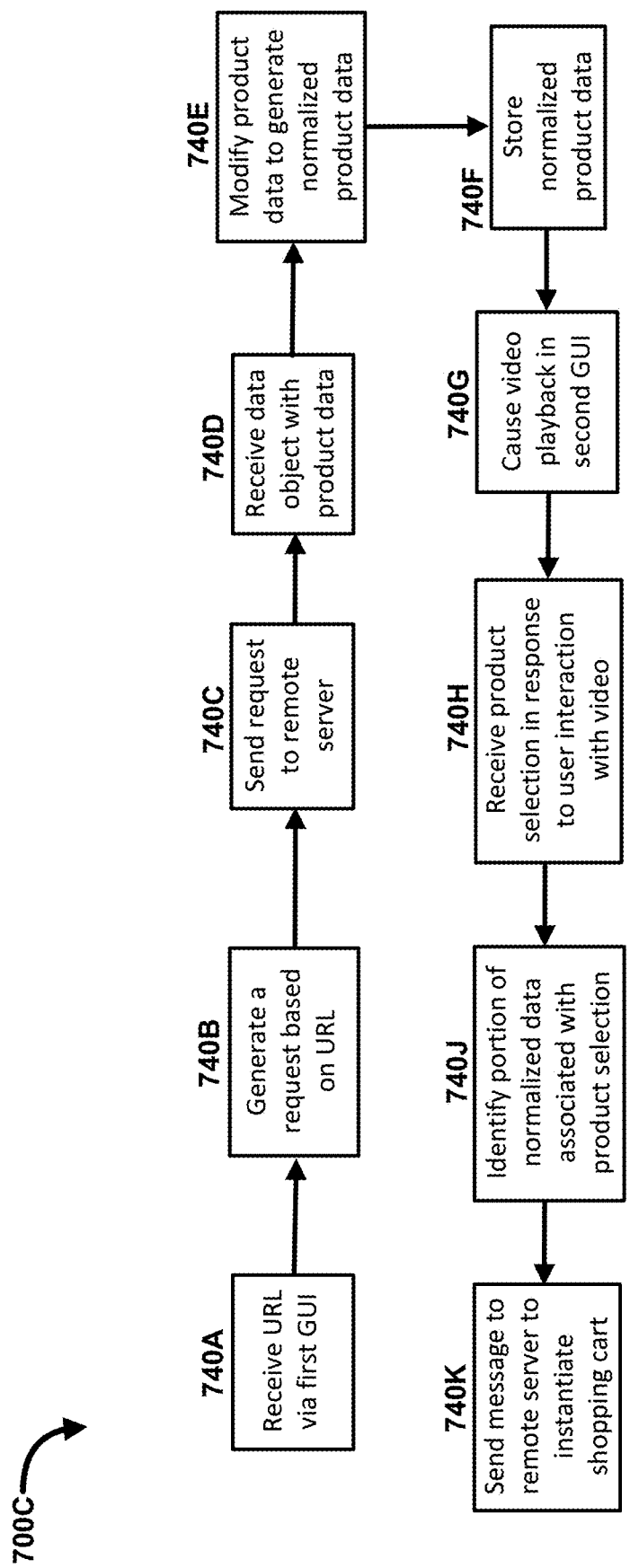
FIG. 7C illustrates an example client setup and user interaction process flow, according to some embodiments.

FIG. 7C illustrates an example client setup and user interaction process flow, according to some embodiments. As shown in FIG. 7C, a processor-implemented method 700C includes the operations shown. At 740A, a uniform resource locator (URL) is received via a first graphical user interface (GUI) operably coupled to a host server. At 740B, a request based on the URL is generated via the host server, and sent to a remote server at 740C. A data object including product data is received, at 740D, from the remote server and in response to the request, the product data is modified to generate normalized product data at 740E via a processor of the host server, and the normalized product data is stored at 740F. The host server causes playback of a video within a second GUI, at 740G. The video can be stored on the host server, and the second GUI can be associated with a mobile device of a user. At 740H, a message encoding a product selection is received at the host server during playback of the video and in response to a user interaction with the video. A portion of the normalized product data associated with the product selection is identified at 740J, and a message including the identified portion of the normalized product data is sent to the remote server at 740K, to cause instantiation of a software shopping cart at the remote server.

Figures 7D, 7E:
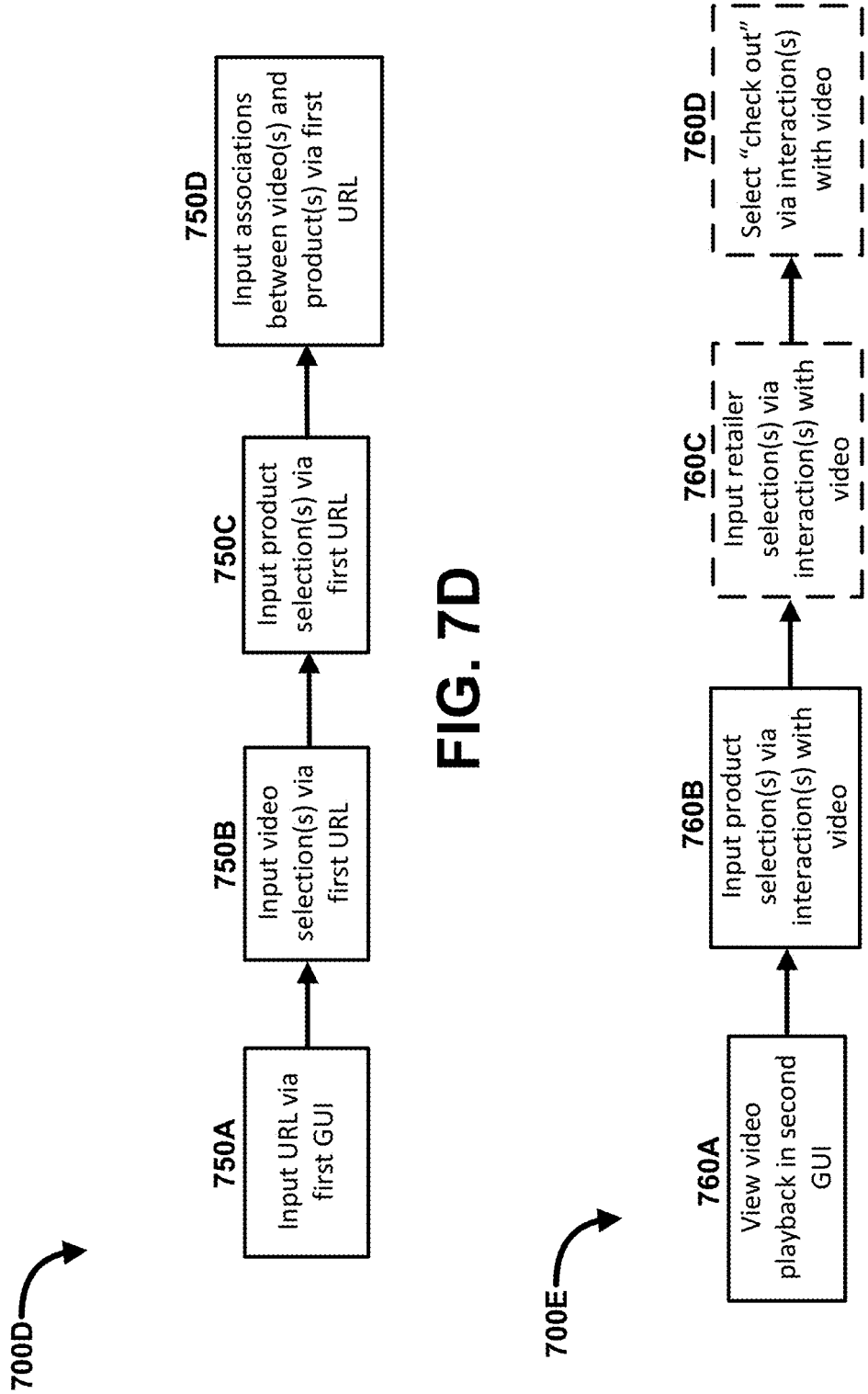
FIG. 7D illustrates an example client setup process flow, according to some embodiments.
FIG. 7E illustrates an example user interaction process flow, according to some embodiments.

FIG. 7D illustrates an example client setup process flow 700D, according to some embodiments. As shown in FIG. 7D, a client can input: a URL (e.g., associated with a product listing) via a first GUI at 750A, one or more video selections via the URL at 750B, one or more product associations 750C, and/or one or more associations between videos and products, such that the input information is received by a host server. The steps 750A, 750B, 750C and 750D can be performed in any order.

FIG. 7E illustrates an example user interaction process flow 700E, according to some embodiments. As shown in FIG. 7E, a user views a video playback in a second GUI (e.g., a CDE rendered via a browser of a mobile device of the user) at 760A, and can input one or more product selections by interacting with the video being played (at 760B). Optionally, the user can also input one or more retailer selections (i.e., upon being presented with retailer options via the second GUI) at 760C. If the user decides to complete a purchase of one or more products selected at 760B, the user selects "check out" via the second GUI by interacting with the video (e.g., with an object embedded in the video) at 760D.

System Compatibility with Multiple Retailers

In some embodiments, products that are featured and/or displayed within the curated destination environment may be available from multiple retailers. The user can be provided with user-selectable options for deciding which retailer they want to "add to cart" on.

Although apps such as Shoppable® can offer the ability to represent a single product across multiple retailers, and to purchase the product with a retailer of choice, Shoppable "owns" the checkout process. In other words, the user checks out with Shoppable (a single platform), and Shoppable passes the order information to a retailer (e.g., Target). By contrast, embodiments of the present disclosure are cross-platform compatible and can direct the user to the retailer to complete their purchase (i.e., to checkout at the client server/website). In other words, in some embodiments, a user does not complete a checkout within the CDE (i.e., a checkout window is not rendered within the CDE). Similarly, in some embodiments, a user cannot view, modify, or purchase selected items from within the CDE, for example because a shopping cart instance is not rendered within the CDE. Rather, an object (e.g., a shopping cart icon) is rendered within the CDE that, when selected by the user, cause the user's browser to be redirected to a client server (e.g., a retailer server) where the instantiated shopping cart is viewable and/or editable, and where the checkout process can be completed.

In some embodiments, the CDE and/or host server do not receive, store, or capture payment (e.g., credit card) information of the user. Alternatively or in addition, the CDE and/or host server do not generate orders, summaries, or lists of items for purchase. Alternatively or in addition, the CDE and/or host server do not receive, store, or capture customer data. Alternatively or in addition, the CDE and/or host server do not receive, store, or capture order data.

Example code for handling base-level logic for parsing product data from product pages of multiple different retailers/clients ("ProdtoProd") is as follows:

```
var request         = require('superagent')
var utils           = require('./utils')
var nodeRequest     = require('request')
var test            = require('./test')
// Brands
var shopify         = require('./shopify')
var bose            = require('./bose')
var dicks           = require('./dicks')
var livingProof     = require('./livingProof')
var bhPhoto         = require('./bhPhoto')
var bananaRepublic  = require('./bananaRepublic')
var target          = require('./target')
var zappos          = require('./zappos')
var demandware      = require('./demandware')
var lancome         = require('./demandware/lancome')
var cr7             = require('./cr7')
var walmart         = require('./walmart')
var amazon          = require('./amazon')
var esteeLauderUk   = require('./esteeLauderUk')
var benefit         = require('./benefit')
var dollarShaveClub = require('./dollarShaveClub')
const db = require('../db.js')
const getHostNameFromUrl = (url) => {
  if (url.indexOf('://www.') != -1) url = url.split('://www.')[1]
  if (url.indexOf('://m.') != -1) url = url.split('://m.')[1]
  if (url.indexOf('://') != -1) url = url.split('://')[1]
  url = url.split('?')[0]
  url = url.split('/')[0]
  return url
}
module.exports = {
  // Main function for getting product info.
  getProductFromUrl(req, res) {
    let url = req.query.url
    if (!url) return errorResponse(res, 'please provide url')
    let productPageHostName = getHostNameFromUrl(url)
    var ref = db.ref( )
ref.child('retailerCarts').orderByChild('productPageHostName').equalTo
(productPageHostName).once('value').then((snapshot) = >{
    let data = snapshot.val( )
    if (!data) return errorResponse(res, 'No retailer cart for
${productPageHostName}')
        let retailerCartObj
        for (let id in data) {
          retailerCartObj = data[id]
        }
        if (url.indexOf('esteelauder.co.uk') != -1) {
          esteeLauderUk.parseUrl(url, res, retailerCartObj)
          return
        }
        if (url.indexOf('bananarepublic.gap.com') != -1) {
          bananaRepublic.parseUrl(url, res, retailerCartObj)
          return
        }
        if (url.indexOf('target.com') != -1) {
          target.parseUrl(url, res, retailerCartObj)
          return
        }
        if (url.indexOf('amazon.com') != -1) {
          amazon.parseUrl(url, res, retailerCartObj)
          return
        }
        if (url.indexOf('amazon.de') != -1) {
          amazon.parseUrl(url, res, retailerCartObj)
          return
        }
```

```
            if (url.indexOf('amazon.es') != -1) {
                amazon.parseUrl(url, res, retailerCartObj)
                return
            }
            if (url.indexOf('lancome-usa.com') != -1) {
                lancome.parseUrl(url, res, 'lancome-usa', retailerCartObj)
                return
            }
            if (url.indexOf('bose.com') != -1) {
                if (url.indexOf('buy.html') == -1) {
                    url = url.replace('.html', '/buy.html')
                }
            }
            requestProductUrl(url, res, (data) => {
                parseReturnedTextForProduct(res, un, data.text, retailerCartObj)
            })
        })
    },
    // Run some tests.
    runTests(req, res) {
        test.run(req, res)
    }
}
const errorResponse = (res, msg) => {
    res.json({
        success: false,
        message: msg
    })
}
const requestProductUrl = (url, res, cb) => {
    request
        .get(url)
        .set('X-API-Key', 'foobar')
        .set('User-Agent', 'Mozilla/5.0 (Windows; U; Windows NT 5.1; en-US; rv:1.8.1.13) Gecko/20080311 Firefox/2.0.0.13')
        .end(function(err, response) {
            if (err) {
                errorResponse(res, 'Error requesting product page. Please confirm product URL is valid.')
                return
            }
            cb(response)
        });
}
const parseReturnedTextForProduct = (res, url, text, retailerCartObj) => {
    if (url.indexOf('drbrandtskincare.com') != -1) {
        product = shopify.parseUrl(text, 'drbrandt',retailerCartObj)
    } else if (url.indexOf('bose.com') != -1) {
        product = bose.parseUrl(text, url, retailerCartObj)
    } else if (url.indexOf('benefitcosmetics.com') != -1) {
        product = benefit.parseUrl(res, text, retailerCartObj)
    } else if (url.indexOf('livingproof.com') != -1) {
        product = livingProof.parseUrl(text, retailerCartObj)
    } else if (url.indexOf('bhphotovideo.com') != -1) {
        product = bhPhoto.parseUrl(text, retailerCartObj)
    } else if (url.indexOf('walmart.com') != -1) {
        product = walmart.parseUrl(text, url, retailerCartObj)
    } else if (url.indexOf('itcosmetics.com') != -1) {
        product = demandware.parseUrl(text, 'itcosmetics', retailerCartObj)
    } else if (url.indexOf('pureology.com') != -1) {
        product = demandware.parseUrl(text, 'pureology', retailerCartObj)
    } else if (url.indexOf('dermablend.com') != -1) {
        product = demandware.parseUrl(text, 'dermablend', retailerCartObj)
    } else if (url.indexOf('cr7.com') != -1) {
        product = cr7.parseUrl(text, retailerCartObj)
    } else if (url.indexOf('zappos.com') != -1) {
        zappos.parseUrl(text, res, retailerCartObj)
        return
    } else if (url.indexOf('dickssportinggoods.com') != -1) {
        dicks.parseUrl(text, res, retailerCartObj)
        return
    } else if (url.indexOf('try.dollarshaveclub.com') != -1) {
        dollarShaveClub.parseUrl(url, res, text, retailerCartObj)
        return
    } else {
        errorResponse(res, We do not currently support URLs from this retailer')
    }
    if (product) {
        res.json({
            success: true,
            product: product
        })
    } else {
        errorResponse(res, 'For some reason product is undefined. Product may be out of stock.')
    }
}
```

Example code for handling the subsequent reading of restructured/normalized data to create forms and/or requests as part of an add-to-cart operation ("StructData") is as follows:

```
const IFRAME_ID='iframe-cart-holder'
const IFRAME_WRAPPER_ID='iframe-cart-holder'
const BUTTON_ID='iframe-cart-button'
import utils from ' . . . /services/utils'
import eventDispatcher from ' . . . /events/dispatch'
import utmParameterHelper from ' . . . /services/utmParameterHelper'
import cartManagerRequests from ' . . . /services/cartManagerRequests'
import store from ' . . . /store'
const STATE=store.state
let buttonHolder
let iframeHolder
let iframeIsLoading
let formHolder
const currentFocusedProduct=( )⇒STATE.currentFocusedProduct
const selectedPrimaryOption=( )⇒STATE.selectedPrimaryOption
const selectedSecondaryOption=( )⇒STATE.selectedSecondaryOption
const currentPlayer=( )⇒STATE.currentPlayer
const cartLink=( )⇒{
    if (currentFocusedProduct( ).cartLink) return
    currentFocusedProduct( ).cartLink
        return currentPlayer( ).cartLink
}
const isTargetCart=( )⇒utils.cartPlatformCheck('target', STATE)
const isBoseCart=( )⇒utils.cartPlatformCheck('bose', STATE)
const isWalmartCart=( )⇒utils.cartPlatformCheck('walmart', STATE)
const isAmazonCart=( )⇒utils.cartPlatformCheck('amazon', STATE)
const isDollarShaveCart=( )⇒utils.cartPlatformCheck('dollarshave', STATE)
const goToTargetUrl=( )⇒goToUrl('https://www-secure.target.com/co-cart')
export default {
    create( ) {
        if (iframeIsLoading) return setTimeout(( )⇒this.create( ) 1000)
        let product=currentFocusedProduct( )
        if (!product) return
        let wrapper=getAndClearIframeWrapper( )
        let iframe=getAndAppendIframe(wrapper)
        let body=getIframeBody(iframe)
        let firstOpt=selectedPrimaryOption( )
        let secondOpt=selectedSecondaryOption( )
        let form=createIframeForm(product, firstOpt, secondOpt)
        body.appendChild(form)
```

```
},
submitForm( ) {
iframeIsLoading=true
buttonHolder.click( )
iframeHolder.onload=( )=>{
    iframeIsLoading=false
}
},
goToCart(eventOptions) {
//Don't checkout if items are still loading.
    if (iframeIsLoading||window.addingBoseProducts||window.addingTargetProducts) {
        return setTimeout(( )=>this.goToCart(eventOptions), 500)
    }
    eventDispatcher('checkoutNow', eventOptions, ( )=>{
        window.checkoutInitiated=true
        if (currentPlayer( ).cartLinkOverride) {
        goToUrl(utmParameterHelper.attachRequiredUtmParameters(currentPlayer( ).cartLinkOverride, currentPlayer( )))
        return
        }
        if (isAmazonCart( )) return
cartManagerRequests.addToAmazonCart(formHolder)
        if (isWalmartCart( ) return cartManagerRequests.goToWalmartUrl( )
        if (isTargetCart( ) return goToTargetUrl( )
        if (isDollarShaveCart( ) {
goToUrl(utmParameterHelper.attachRequiredUtmParameters(formHolder.action, currentPlayer( ))
        return
        }
        goToUrl(utmParameterHelper.attachRequiredUtmParameters(cartLink( ) currentPlayer( )))
    })
},
shopNow( ) {
    let player=currentPlayer( )
    let url=player.offerLink||player.cartLink
    goToUrl(utmParameterHelper.attachRequiredUtmParameters(url, currentPlayer( )))
},
getIframeForm( ) {
    return formHolder
},
goToTargetUrl: goToTargetUrl
}
const goToUrl=(url)=>window.top.location=url
const getAndClearIframeWrapper=( )=>{
    let wrapper=document.getElementById(IFRAME_WRAPPER_ID)
    wrapper.innerHTML=' '
    return wrapper
}
const getAndAppendIframe=(wrapper)=>{
    let iframe=document.createElement('iframe')
    iframe.id=IFRAME_ID
    iframe.name=IFRAME_ID
    iframe.className=IFRAME_ID
    iframe.style.width='0px'
    iframe.style.height='0px'
    wrapper.appendChild(iframe)
    iframeHolder=iframe
    return iframe
}
const getIframeBody=(iframe)=>{
    let doc=iframe.contentDocument||iframe.contentWindow.document
    return doc.body
}
const createIframeForm=(product, primaryOption, secondaryOption)=>{
    let form=document.createElement('form')
    let formAction
    if (product.cartMetadata) formAction=product.cartMetadata.addToCartUrl
    //AMAZON NOTE
    //This line sends them to Amazon Add to Cart Page.
    if (product.amazonLink) formAction=product.amazonLink
    //Alternately, send them to the product page
    //if (product.amazonLink && product.productUrl) formAction=product.productUrl
    //END AMAZON NOTE
    if (primaryOption && primaryOption.setAddToCartUrl) formAction=primaryOption.setAddToCartUrl
    if (secondaryOption && secondaryOption.setAddToCartUrl) formAction=secondaryOption.setAddToCartUrl
    form.action=formAction
    form.method='POST'
    let hiddenInputs
    if (product && product.cartMetadata && product.cartMetadata.hiddenInputs) {
        hiddenInputs=product.cartMetadata.hiddenInputs
    }
    if (primaryOption && primaryOption.setHiddenInputs) hiddenInputs=primaryOption.setHiddenInputs
    if (secondaryOption && secondaryOption.setHiddenInputs) hiddenInputs=secondaryOption.setHiddenInputs
    if (hiddenInputs) {
        hiddenInputs.map((hiddenInput)=>{
            let input=document.createElement('input')
            input.type='hidden'
            for (let key in hiddenInput) {
                input[key]=hiddenInput[key]
            }
            form.appendChild(input)
        })
    }
    let button=document.createElement('button')
    button.id=BUTTON_ID
    button.type='submit'
    buttonHolder=button
    form.appendChild(button)
    formHolder=form
    return form
}
```

Figure 8A:
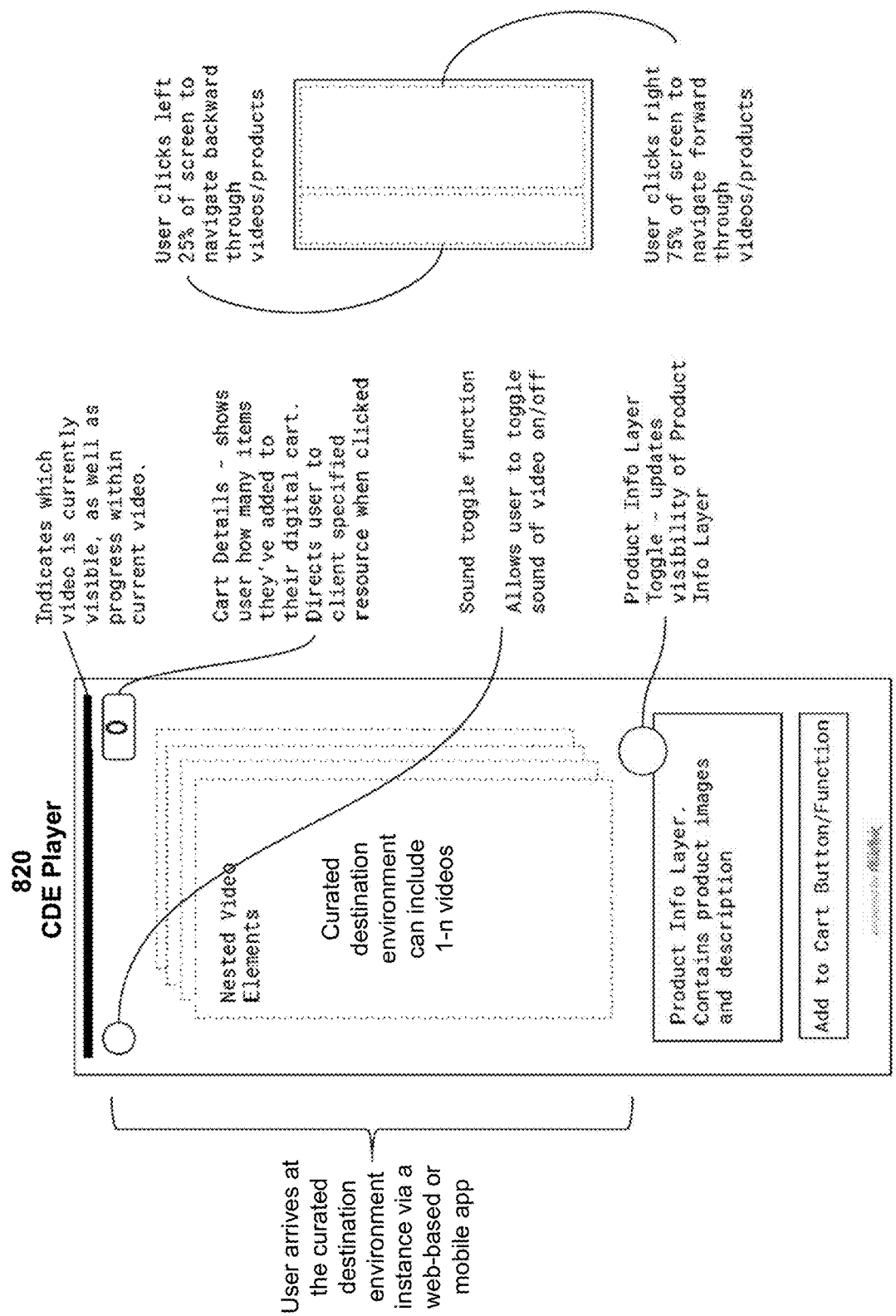
FIG. 8A is a diagram illustrating an example curated destination environment, according to some embodiments.

FIG. 8A is a diagram illustrating an example layout of user operations within a curated destination environment ("CDE") player 820, according to some embodiments. The CDE player 820 can be software running on, for example, a mobile device such as a smartphone, and the curated destination environment instance can be reached by a user, for example, via a web-based or mobile app. Example code for implementing a CDE player is as follows:

```
{
"active": true,
"brandId": "9bad8fdc-b5f0-44ee-90c9-63924999d3f0",
"brandName": "Dr. Brandt",
"brandSlug": "dr-brandt",
"canLaunch": true,
"cartLink": "https://www.drbrandtskincare.com/cart",
"cartName": "Dr. Brandt",
```

```
"cartPlatform": "shopify",
"cartSupport": true,
"category": "beauty",
"createdAt": "Tue Nov. 21, 2017 12:07:38 GMT-0500
    (EST)",
"createdBy": "platform@mikmak.tv",
"created_at": "Wed May 31, 2017 14:59:59 GMT-0400
    (EDT)",
"created_by": "maggie@mikmak.tv",
"facebookPixelId": "385178481686513",
"id": "3fa33196-4c45-4e85-9ae0-6e364d381766",
"isActive": true,
"modifiedAt": "Tue Nov. 21, 2017 12:07:38 GMT-0500
    (EST)",
"modifiedBy": "adam@mikmak.tv",
"modified_at": "Fri Mar. 23, 2018 11:15:59 GMT-0400
    (EDT)",
"modified_by": "maggie@mikmak.tv",
"playerName": "Magnetight",
"playerType": "standard",
"products": [{
    "SKU": "7614779585",
    "cartMetadata":
        "addToCartUrl":   "https://www.drbrandtskincare.
            com/cart/add.js",
        "hiddenInputs": [{
            "class": "original_select_7614779585",
            "data-productid": "7614779585",
            "name": "id",
            "value": "24311638401"
        }]
    }
    "cartPlatform": "drbrandt",
    "category": "beauty",
    "description": "This revolutionary magnetized mask
        counteracts the effects of stress and environmental
        damage that cause premature aging. Electromagnetic
        interactions enhance skin's ability to rejuvenate
        itself for a younger and more vibrant appearance. For
        all skin types.",
    "id": 0,
    "name": "MAGNETIGHT AGE DEFIER",
    "price": "75.00",
    "product-images"
"//cdn.shopify.com/s/files/1/1347/3227/products/MAG-
    NETIGHT-AGE-DEFIER-1024×1024_d50cd5b5-
    6737-429f-a058-edb7481ee3f8_1024×
    1024.png?v=1502742445",
"//cdn.shopify.com/s/files/1/1347/3227/products/MAG-
    NETIGHT_-_VIEW1_1024×
    1024.jpg?v=1502742445",
"//cdn.shopify.com/s/files/1/1347/3227/products/MAG-
    NETIGHT_-_VIEW2_1024×
    1024.jpg?v=1502742445"],
    "productUrl":   "https://www.drbrandtskincare.com/
        products/magnetight",
    "slug": "magnetight-age-defier"
}]
"tracking": "(function (url) {/*Tracking Bootstrap Set Up
    DataLayer objects/properties here*/if(!window.Data-
    Layer){window.DataLayer={  };   } if(!DataLayer.
    events){DataLayer.events={ };}DataLayer.events.Site-
    Section=\\\"1\\\"; var loc, ct=document.createElement
    (\\\"script\\\"); ct.type=\\\"text/javascript\\\"; ct.async=
    true;   ct.src=url;   loc=document.getElementsByTag
    Name(\\\"script\\\")[0];   loc.parentNode.insertBefore
    (ct,   loc);}(document.location.protocol+\\\"//js.rmtag.
    com/112215.ct.js\\\"));",
"trackingPixel": " ",
"trackingRaw": " ",
"trafficType": "organic",
"utmParameters"
"?mikmakAttach=true&mikmakUserId=USER+ID+
    HERE&rmatt=tsid:1030357|c
    id:54823|cgid:548233739637|crid:16157250",
    "videos": [{
        "id": "0a74f66f-f82b-6d92-2922-23aa5c20b79c",
        "videoName": "drbrandt_0410_01-sm.mp4",
        "videoUrl": "http://mikmak.s3.amazonaws.com/up-
            loads/9001435b-be6e-42ec-a270-1f8a0fd29338/
            drbrandt_0410_01-sm.mp4"
    }]
}
An example configuration file for a CDE is as follows:
{
"name": "sample-attach-alpha",
"version": "0.1.0",
"description": "Example version of attach player",
"main": "client/index.js",
"scripts": {
    "test": "npm run unit",
    "unit": "cross-env BABEL_ENV=test karma start test/
        unit/karma.conf.js--single-run",
    "e2e": "node test/e2e/runner.js",
    "build": "webpack--config build/webpack.prod.js",
    "dev": "node build/server.js",
    "lint": "xo**/client/**/*.{vue,js}!node modules/**",
    "delete-test-report": "git checkout./test/unit/coverage/
        lcov-report/index.html",
    "deploy-stage": "npm run build && firebase deploy –P
        staging",
    "deploy-prod": "npm run build && firebase deploy –P
        production",
    "deploy-x": "npm run build && firebase deploy –P
        experimental",
    "deploy-to-unsecure": "aws s3 sync--acl\"public-
        read\" dist/s3://attach-demo.mikmak.tv",
    "deploy": "npm run build && firebase deploy –P
        staging && firebase deploy –P production && npm
        run deploy-to-unsecure",
    "deploy-notest": "webpack--config build/webpack.
        prod.js&& firebase deploy –P staging && firebase
        deploy –P production && npm run deploy-to-unse-
        cure"
},
"author": "Sample123",
"license": "EntityABC",
"xo": {
    "extends": "./.eslintrc",
    "esnext": true,
    "envs": [
        "browser"
    ]
}
"dependencies": {
    "babel-runtime": "^6.18.0",
    "clipboard": "^1.6.1",
    "fs": "0.0.1-security",
    "good-listener": "^1.2.2",
    "grunt-karma": "^2.0.0",
    "hammer] s": "^2.0.8",
    "karma-cli": "^1.0.1",
```

```
    "promise-polyfill": "^6.0.2",
    "select": "^1.1.2",
    "setimmediate": "^1.0.5",
    "tiny-emitter": "^2.0.2",
    "vue": "^2.2.0",
    "vue-router": "^2.0.0",
    "vue-style-loader": "^3.1.1",
    "vue-touch": "^2.0.0-beta.4",
    "vuex": "^2.0.0",
    "vuex-router-sync": "^4.0.0"
}
"devDependencies": {
    "autoprefixer": "^6.4.0",
    "babel-core": "^6.16.0",
    "babel-loader": "^6.2.4",
    "babel-preset-vue-app": "^0.4.0",
    "chai": "^3.5.0",
    "chalk": "^1.1.3",
    "copy-webpack-plugin": "^4.0.1",
    "cross-env": "^2.0.0",
    "css-loader": "^0.23.1",
    "es6-promise": "^4.1.0",
    "eslint-config-vue": "latest",
    "eslint-plugin-vue": "latest",
    "express": "^4.14.0",
    "extract-text-webpack-plugin": "^2.0.0-rc.3",
    "file-loader": "^0.9.0",
    "firebase-tools": "^3.17.6",
    "friendly-errors-webpack-plugin": "^1.1.2",
    "html-webpack-plugin": "^2.22.0",
    "karma": "^1.7.1",
    "karma-coverage": "^1.1.1",
    "karma-mocha": "^1.3.0",
    "karma-sinon-chai": "^1.3.1",
    "karma-sourcemap-loader": "^0.3.7",
    "karma-spec-reporter": "0.0.30",
    "karma-webpack": "^2.0.2",
    "mocha": "^3.2.0",
    "offline-plugin": "^4.5.3",
    "postcss-loader": "^0.9.1",
    "postcss-nested": "^1.0.0",
    "raw-loader": "^0.5.1",
    "sinon": "^2.1.0",
    "sinon-chai": "^2.8.0",
    "style-loader": "^0.13.1",
    "vue-loader": "^11.0.0",
    "vue-template-compiler": "^2.2.0",
    "webpack": "2.2.0",
    "webpack-dev-middleware": "^1.8.1",
    "webpack-hot-middleware": "^2.12.2",
    "xo": "^0.18.0"
}
}
```

Figure 8B:
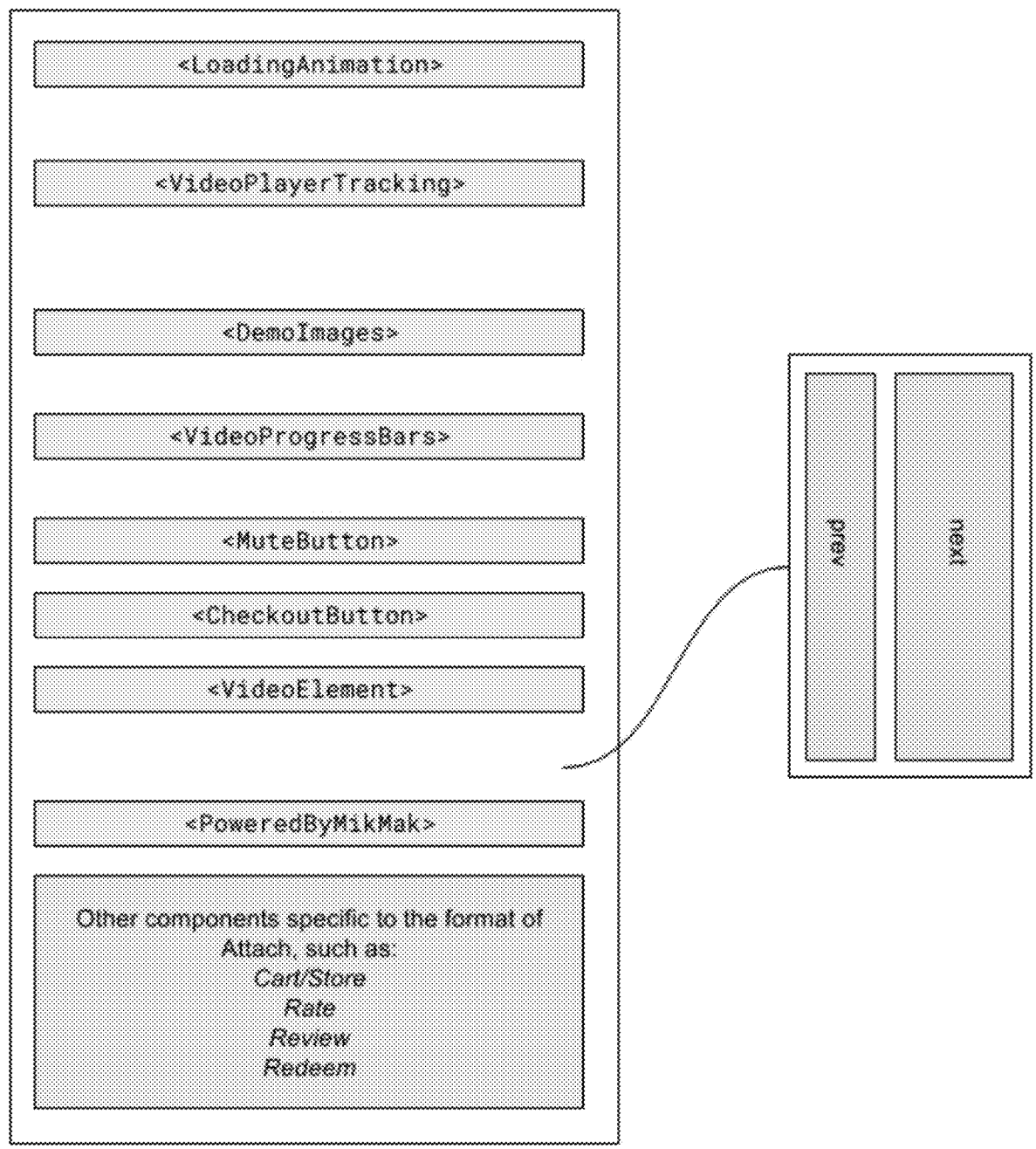
FIG. 8B is a diagram illustrating an example curated destination environment, according to some embodiments.

FIG. 8B is a diagram illustrating an example layout of a curated destination environment, according to some embodiments. As shown in FIG. 8B, the viewable area of the curated destination environment can be partitioned into components, each region having its own distinct functionality. The components include: a "loading animation" component, a "video player tracking" component, a "demo images" component, a "video progress bar" component, a "mute button" component, a "checkout button" component, a "video element" component, and, optionally, one or more additional components such as: a "cart" component, a "rate" component, a "review" component, a "redeem" component, etc. The loading animation component can display load progress associated with a video, until the video has loaded.

The video player tracking component can load user (or "player") and/or brand tracking scripts and/pixels, and may not be viewable to the user. The demo images component can display product images and/or other elements for a desktop mode or demo mode. The video progress bars component can monitor and/or display progress of a currently-playing video. The video element component can include a video element and associated functionality/behaviors, for example including a transparent overlay of navigation buttons. The navigation buttons can be configured such that, if the user clicks or otherwise haptically interacts with the left side of the display (e.g., within the leftmost 25% of the display area), the curated destination environment player navigates in a backward direction through the nested video elements and/or products, and if the user clicks or otherwise haptically interacts with the right side of the display (e.g., within the rightmost 75% of the display area), the curated destination environment player navigates in a forward direction through the nested video elements and/or products.

Figure 8C:
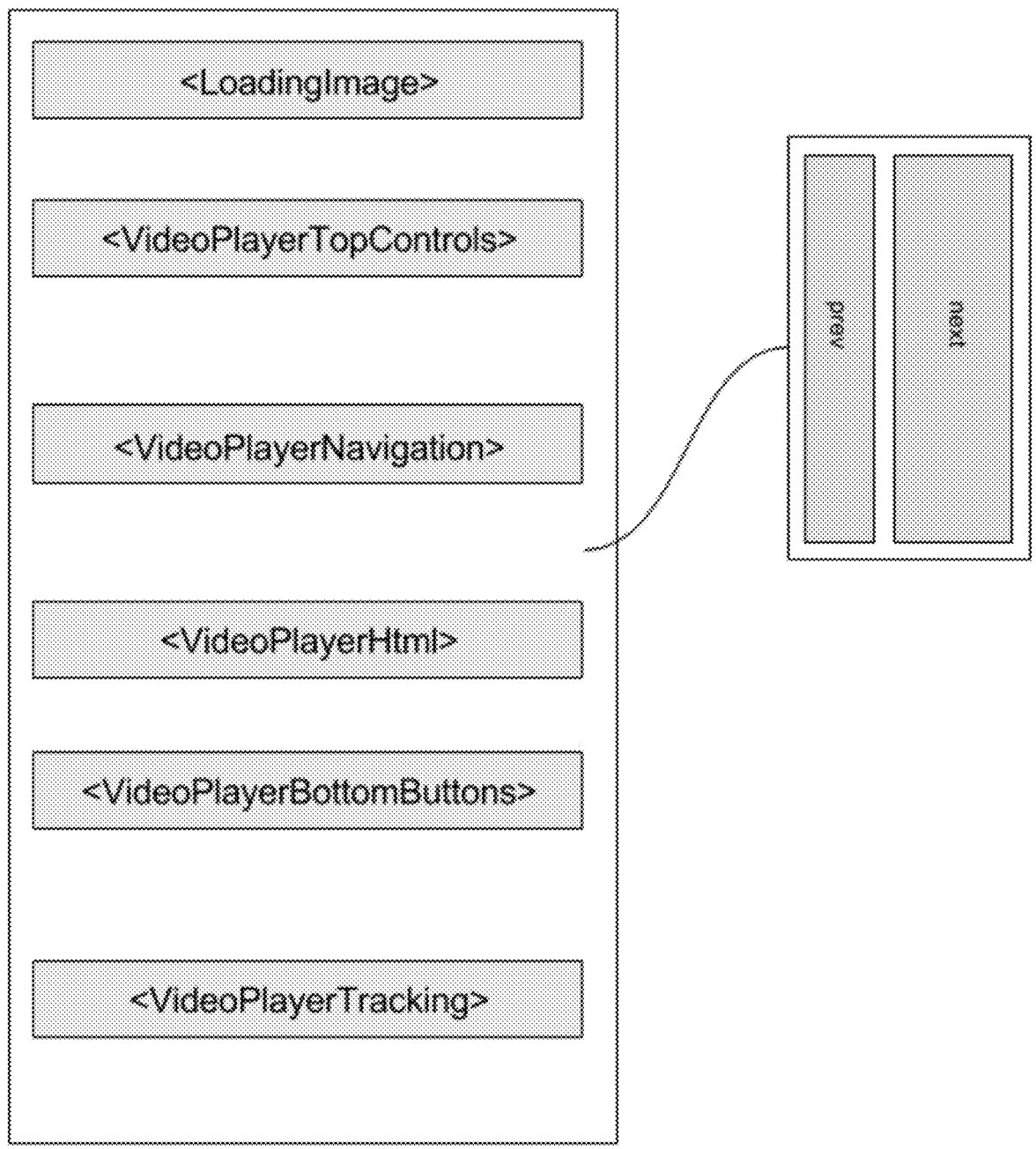
FIG. 8C is a diagram illustrating an example curated destination environment, according to some embodiments.

FIG. 8C is a diagram illustrating an example layout of a curated destination environment, according to some embodiments. As shown in FIG. 8C, the viewable area of the curated destination environment can be partitioned into regions, each region having its own distinct functionality. The components include: a "loading image" component, a "video player top controls" component, a "video player navigation" component, a "video player html" component, a "video player bottom buttons" component, and/or a "video player tracking." The loading image component is an overlay that displays a loading image. The video player top controls component can include a mute button, a shopping cart button, and/or a product brand name overlay. The video player navigation component can include invisible or transparent regions (e.g., rectangular regions) that, when clicked or haptically interacted with, navigate to a next video or a previous video. For example, the transparent regions can also be configured such that, if the user clicks or otherwise haptically interacts with the left side of the display (e.g., within the leftmost 25% of the display area), the curated destination environment player navigates in a backward direction through the nested video elements and/or products, and if the user clicks or otherwise haptically interacts with the right side of the display (e.g., within the rightmost 75% of the display area), the curated destination environment player navigates in a forward direction through the nested video elements and/or products. The video player component can include the actual video element. The video player bottom buttons component can include add-to-cart button(s) and/or viewable product information. The video player tracking component can be a blank region of the viewable area (i.e., where no images or text are displayed) where tracking pixels and/or tracking scripts not viewable by the user can reside.

Within the curated destination environment, a predetermined number of nested video elements (e.g., collectively defining a set of minimercials), for example as specified by a client during the video and product selection step 718A of FIG. 7) can be sequentially presented, via a GUI, to the user/shopper. The GUI includes a product information panel that includes product images and/or description. The product information displayed within the product information panel can be linked to a video element. As a user sequentially views each of the multiple nested video elements, the product information displayed in the product information panel can change accordingly (as each nested video element may be linked to different product information). The GUI can also include a sound toggle object (e.g., a button) that a user can tap (or otherwise haptically interact with) to toggle the audio volume of the video ON or OFF. The GUI can also include an "Add to Cart" button and a product information layer toggle object (e.g., a button) that a user can tap (or otherwise haptically interact with) to toggle the display of a product information panel between "visible" and "not visible." The GUI can also include a status/progress bar that indicates one or both of: which video element is currently being viewed, or how much of the video has been viewed as of a particular time of observation. The GUI also includes a cart details window that displays a number of items that a user has remotely added to their digital cart during the curated destination environment session. In some implementations, when the cart details window is clicked or otherwise selected by the user, a browser of the user's mobile device is directed to a client-specified resource (e.g., a retailer website where the shopping cart was instantiated and resides). Alternatively or in addition, a GUI of the curated destination environment can be configured such that, if the user clicks or otherwise haptically interacts with the left side of the display (e.g., within the leftmost 25% of the display area), the curated destination environment player navigates in a backward direction through the nested video elements and/or products, and if the user clicks or otherwise haptically interacts with the right side of the display (e.g., within the rightmost 75% of the display area), the curated destination environment player navigates in a forward direction through the nested video elements and/or products.

Figure 9:
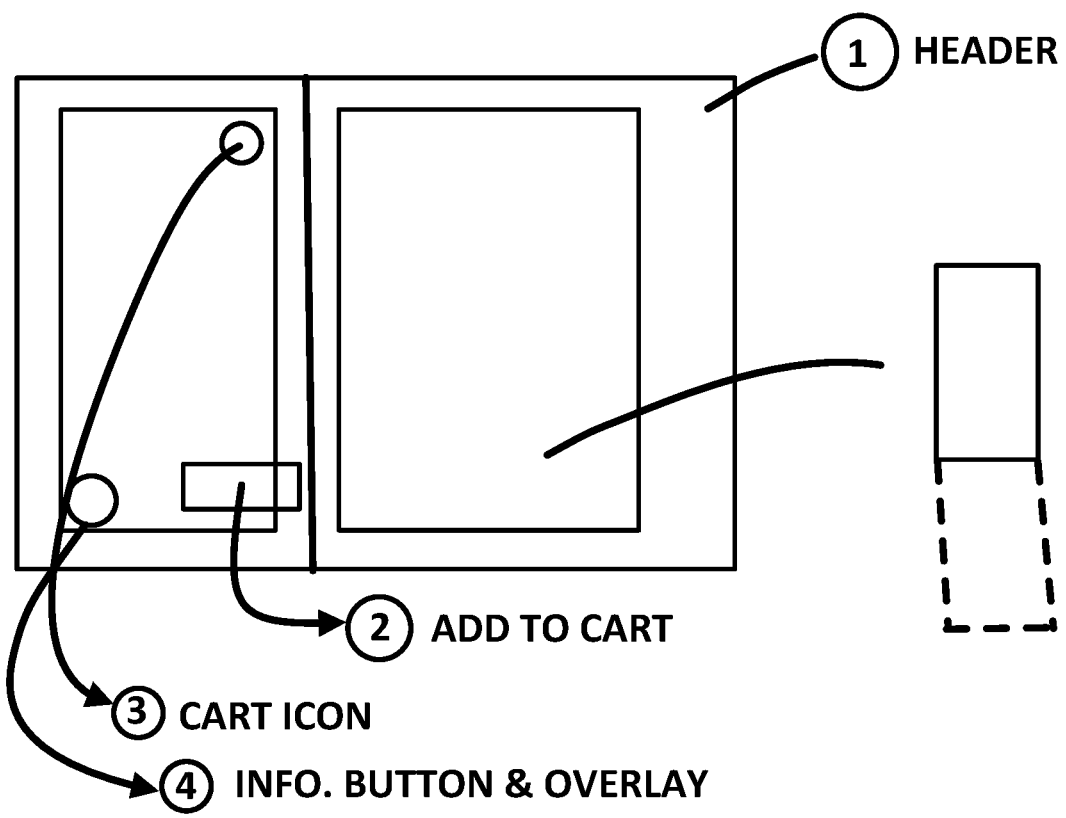
FIG. 9 is a set of wireframe diagrams for an example software application, according to some embodiments.
Figure 9:
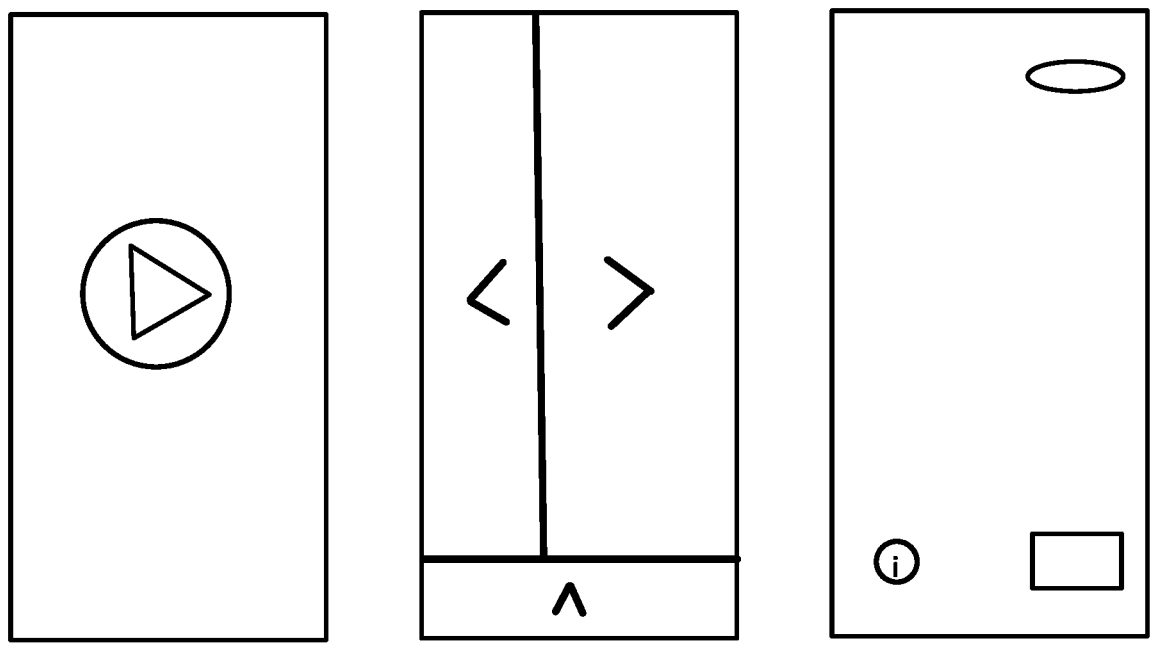

FIG. 9 is a set of wireframe diagrams for an example software application, according to some embodiments.

Example GUIs

Figure 10:
FIGS. 10-15 illustrate example implementations, including example curated destination environment graphical user interfaces ("GUIs"), according to some embodiments.

FIGS. 10-15 illustrate example implementations, including example GUIs, according to some embodiments. FIG. 10 illustrates an initial engagement between a user of social media and a curated destination environment instance. At 1025A, a user may be interacting with an INSTAGRAM story, and the INSTAGRAM story includes a message "Swipe up to shop." Upon swiping up, the user (now a "shopper") may be routed to a predetermined URL and presented with the curated destination environment 1025B. The transition can be smooth in that it maintains the "native" feel of INSTAGRAM. At 1025C, the user adds one or more items to a remote shopping cart (e.g., residing on a retailer server and accessible via a retailer URL), for example by selecting "Add to Cart $25.99" (shown in 1025B), without leaving or being navigated away from the redirect environment. As shown in 1025C, once an item has been added to the remote shopping cart, the user can be presented with user-selectable options to "Keep Shopping" or "Checkout Now." Alternatively or in addition, users can view detailed product information (1025D), for example by selecting "MORE INFO" (shown in 1025B), to cause the display of additional images and/or descriptions of the item within the GUI. A number of items already selected for purchase (i.e., added to the remote shopping cart) is indicated via a cart icon in the upper right corner of the GUI. Clicking the cart leads the user to a retailer's checkout webpage. At 1025, and where applicable, a user can make selections about product details such as color, size, etc.

Figure 11:
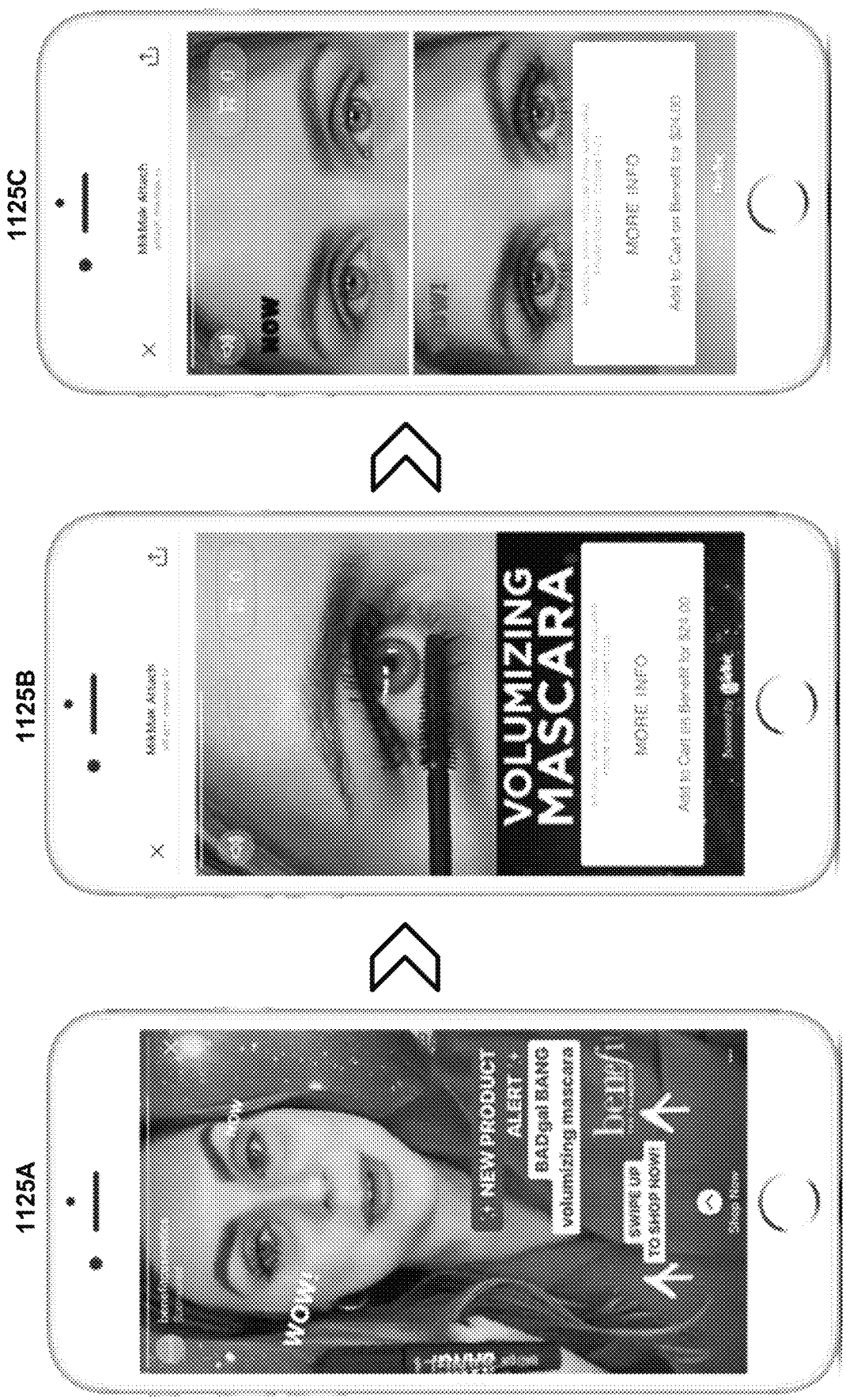
Figure 12:
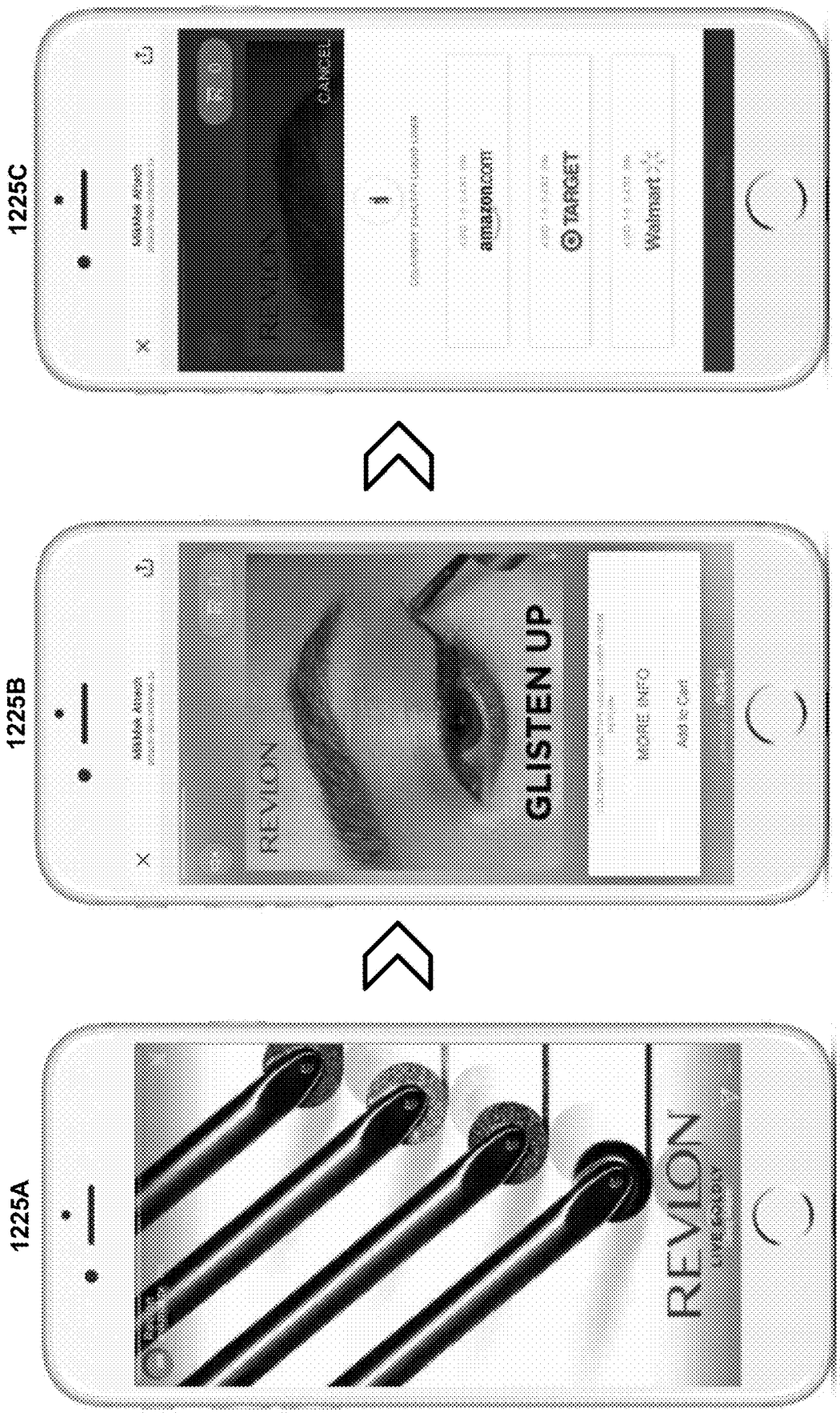

The GUIs of FIG. 11 provide a first additional example of a transition from a social media setting (1125A) to a curated destination environment (1125B and 1125C). The GUIs of FIG. 12 provide a second additional example of a transition from a social media setting (1225A) to a curated destination environment (1225B and 1225C). In particular, the GUI of 1225C shows the additional functionality of providing a user with an option to choose which retailer they would like to purchase a selected product from (e.g., Amazon, Target, Walmart), e.g., in response to a user's selection of the product. In response to the user's selection of a retailer, a cart will be instantiated remotely at the selected retailer without the user leaving the curated destination environment. Additionally, in a multicart implementation, the user may choose to purchase multiple different products from multiple different retailers, and cause remote instantiation of multiple associated software shopping carts.

Figure 13:
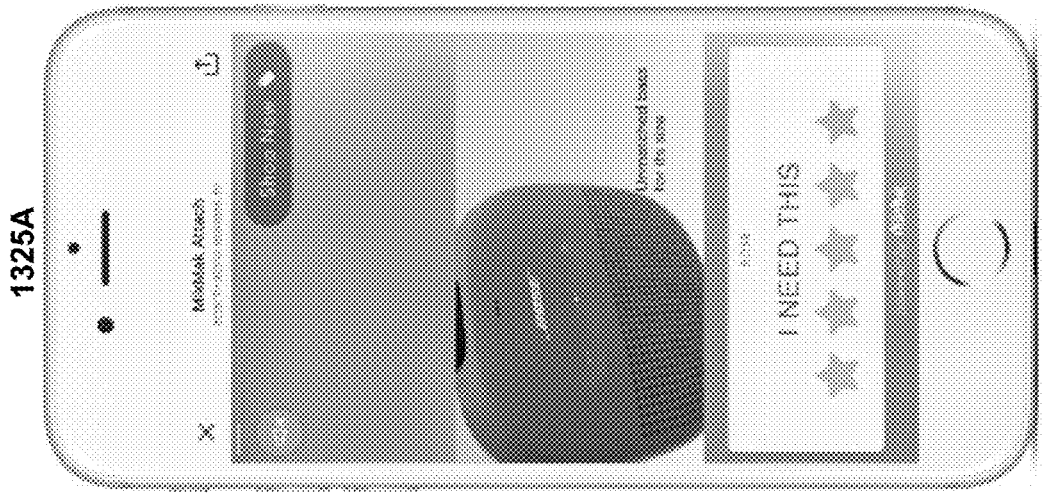
Figure 13:
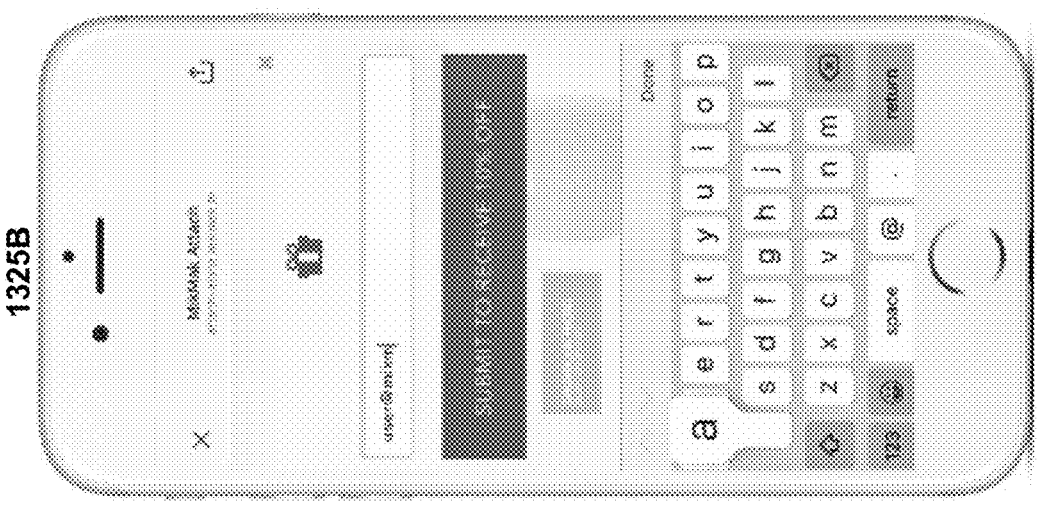
Figure 13:
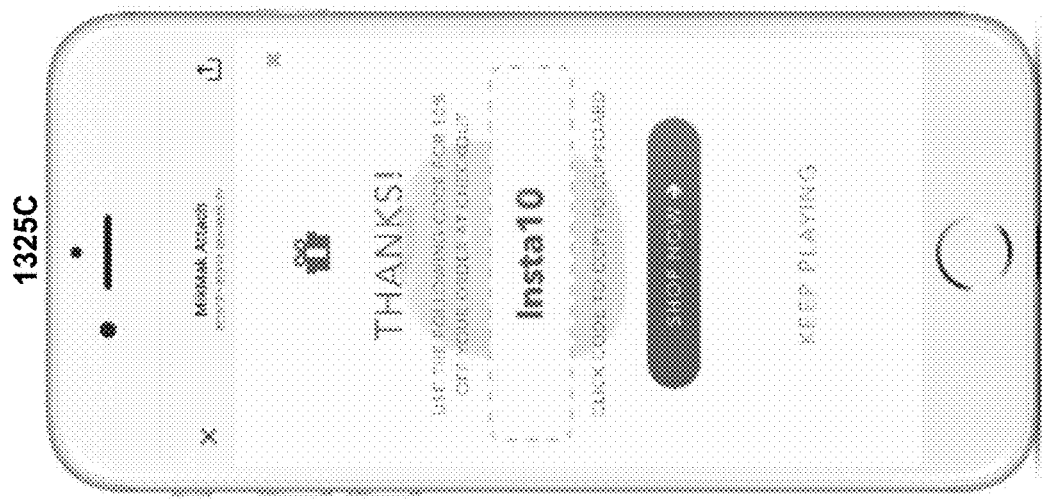

FIG. 13 shows a curated destination environment GUI in which a video is overlaid with a user-modifiable product rating graphic (1325A). At 1325B, a curated destination environment GUI is shown that includes a text field in which a user can enter his/her email address to receive a promotional incentive. Upon entry of the email address, the user can be presented with a curated destination environment GUI 1325C that includes a promotional code in exchange for the provided email address.

Figure 14:
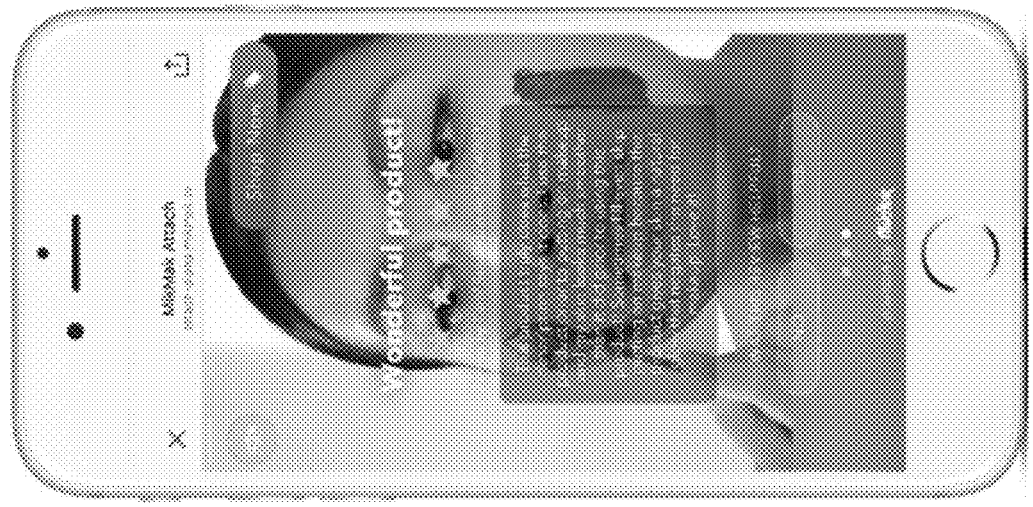
Figure 14:
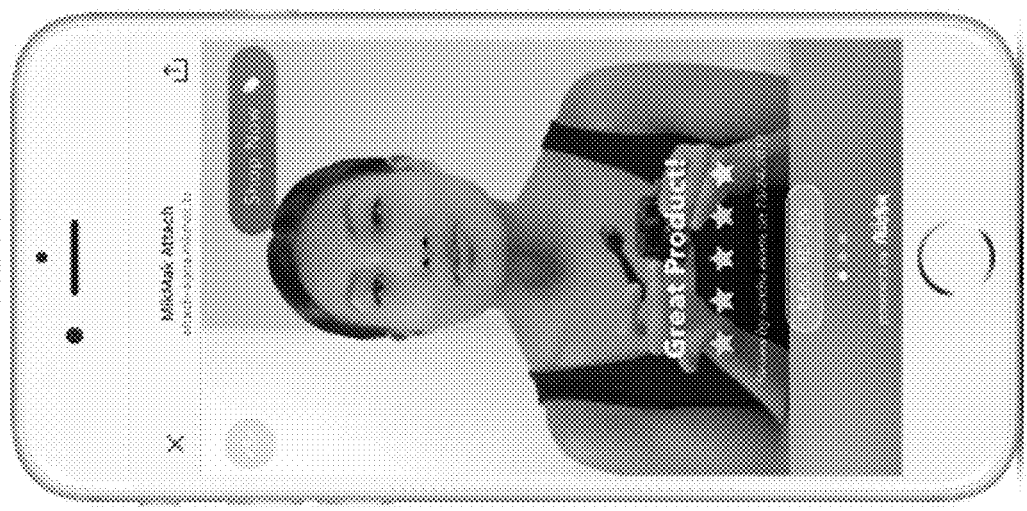

FIG. 14 shows a curated destination environment GUI in which a video is overlaid with a product rating previously submitted for a product by another user (1425A). The GUI of 1425A includes a user-selectable button "Read Review." Upon selection of the "Read Review" button, the user can be presented with an expanded view (1452B) that includes the product rating of 1425A as well as the text from an associated product review.

Figure 15:
Figure 15:

FIG. 15 shows a curated destination environment GUI in which a video is overlaid with scrollable promotional offers (e.g., for online and/or in-store purchases of a product) (1525A). In some implementations, upon a user's selection of a promotion, a promotional code can be displayed within the GUI and/or the promotional code can be copied to a clipboard of the mobile device (1525B).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the disclosure and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (methods and systems for providing shoppable video layers for social media) may be implemented using hardware, software, or a combination thereof. When implemented in software, the software code can be executed on any suitable processor or collection of processors, whether provided in a single computer or distributed among multiple computers.

Further, it should be appreciated that the present methods and systems for providing shoppable video layers for social media may be used in conjunction with computers/compute devices, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In this disclosure, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range.

Where the stated range includes one or both of the limits, ranges excluding either or both of those included limits are also included in the disclosure.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus, comprising:
   at least one processor; and
   a memory operatively coupled to the at least one processor, the at least one processor configured to:
   receive, via a first graphical user interface (GUI) operably coupled to a host server, a first uniform resource locator (URL) associated with a product;
   generate, via the host server, a request based on the first URL;
   send the request to a first remote server;
   receive, from the first remote server and in response to the request, product data including (1) an option data parameter including a matrix of identifiers associated with available product features for the product, and (2) a cart metadata parameter that includes information for generating a structured request to instantiate a shopping cart session;
   modify, via the processor, the product data by at least one of replacing portions of the product data, removing portions of the product data, or trimming the product data, to generate normalized product data;
   store the normalized product data in the memory as part of a normalized data set that is associated with a plurality of different retailers and that has a uniform data structure;
   receive, via the first GUI, an indication of a video and an indication of a product to be associated with the video;
   generate a retailer-agnostic curated destination environment ("CDE") including the video and a representation of the selected product, and having a multicart functionality;
   generate a unique identifier ("ID") for the CDE, the CDE being accessible via a second URL that includes the unique ID;
   send a signal to render the CDE within a second GUI, in response to a user interaction with a primary environment different from the CDE, the second GUI being associated with a mobile device of a user;
   receive, at the host server during playback of the video and in response to a first user interaction with the CDE, a message encoding a product selection;
   identify a portion of the normalized product data associated with the product selection;
   send a message to the first remote server, the message including the identified portion of the normalized product data, to cause instantiation and population of a first software shopping cart at the first remote server while the playback of the video continues without a browser of the mobile device of the user being redirected to the first remote server, the first remote server associated with a first retailer from the plurality of different retailers;
   in response to a second user interaction with the CDE, the second user interaction made while the playback of the video continues, cause instantiation of a second software shopping cart at a second remote server associated with a second retailer from the plurality of different retailers while the playback of the video continues without the browser of the mobile device of the user being redirected to the second remote server; and
   send, in response to a third user interaction with the CDE, the third user interaction representing a user selection of a checkout object within the CDE, a signal to cause the browser of the mobile device of the user to navigate to the first software shopping cart at the first remote server or to the second software shopping cart at the second remote server, wherein the CDE does not include a shopping cart instance.

2. The apparatus of claim 1, wherein the first user interaction with the CDE is a haptic input.

3. The apparatus of claim 1, wherein the first user interaction with the CDE is a selection of an "Add to Cart" button.

4. The apparatus of claim 1, wherein the CDE further includes an overlay having a plurality of navigation buttons, each navigation button from the plurality of navigation buttons configured to navigate the CDE in a predefined direction when the CDE is rendered within the second GUI and the user interacts with that navigation button.

5. The apparatus of claim 1, wherein the CDE further includes a tracking script not viewable by the user when the CDE is rendered within the second GUI.

6. A processor-implemented method, comprising:
   receiving, via a first graphical user interface (GUI) operably coupled to a host server, a first uniform resource locator (URL) associated with a product;
   generating, via the host server, a request based on the first URL;
   sending the request to a first remote server;
   receiving, from the first remote server and in response to the request, product data including (1) an option data parameter including a matrix of identifiers associated with available product features for the product, and (2) a cart metadata parameter that includes information for generating a structured request to instantiate a shopping cart session;
   modifying, via a processor of the host server, the product data by at least one of replacing portions of the product data, removing portions of the product data, or trimming the product data, to generate normalized product data;
   storing the normalized product data as part of a normalized data set that is associated with a plurality of different retailers and that has a uniform data structure;
   generating a retailer-agnostic curated destination environment ("CDE") including a video and a representation of a product, the video being stored on the host server;
   generating a unique identifier ("ID") for the CDE, the CDE being accessible via a second URL that includes the unique ID;
   causing the CDE to be presented within a second GUI, in response to a user interaction with a primary environment different from the CDE, the second GUI being associated with a mobile device of a user;
   receiving, at the host server during presentation of the CDE and in response to a first user interaction with the video, a message encoding a product selection;
   identifying a portion of the normalized product data associated with the product selection;
   sending a message to the first remote server, the message including the identified portion of the normalized product data, to cause instantiation and population of a first software shopping cart at the first remote server while the playback of the video continues without a browser of the mobile device of the user being redirected to the first remote server, the first remote server associated with a first retailer from the plurality of different retailers;

in response to a second user interaction with the CDE, the second user interaction made while the playback of the video continues, causing instantiation of a second software shopping cart at a second remote server associated with a second retailer from the plurality of different retailers while the playback of the video continues without the browser of the mobile device of the user being redirected to the second remote server; and sending, in response to a third user interaction with the CDE, the third user interaction representing a user selection of a checkout object within the CDE, a signal to cause the browser of the mobile device of the user to navigate to the first software shopping cart at the first remote server or to the second software shopping cart at the second remote server.

7. The method of claim 6, further comprising receiving a return message from the first remote server, the return message encoding an indication that instantiation of the first software shopping cart was successful.

8. The method of claim 6, further comprising passing a third URL to the mobile device, the third URL being associated with the first software shopping cart, to cause navigation, via the browser of the mobile device, to the third URL.

9. The method of claim 6, wherein the request includes a hypertext transfer protocol (HTTP) GET method token.

10. The method of claim 6, wherein the receiving the product data is via a web interface of the host server.

11. The method of claim 6, wherein the first software shopping cart is accessible via the mobile device.

12. The method of claim 6, further comprising at least one of:
toggling between videos from the video sequence in response to a fourth user interaction with the CDE; or
toggling display of a product-information layer on the video during playback of the video and in response to a fourth user interaction with the CDE.

13. The method of claim 6, wherein the CDE further includes a plurality of additional videos to be played in a video sequence that includes the video.

14. A non-transitory processor-readable medium storing code representing processor-executable instructions, the code comprising code to cause the processor to:
receive, via a first graphical user interface (GUI) operably coupled to a host server, a first uniform resource locator (URL) associated with a product;
generate, via the host server, a request based on the first URL;
send the request to a first remote server;
receive, from the first remote server and in response to the request, product data including (1) an option data parameter including a matrix of identifiers associated with available product features for the product, and (2) a cart metadata parameter that includes information for generating a structured request to instantiate a shopping cart session;
modify, via the processor, the product data by at least one of replacing portions of the product data, removing portions of the product data, or trimming the product data, to generate normalized product data;
store the normalized product data in a memory operably coupled to the processor, as part of a normalized data set that is associated with a plurality of different retailers and that has a uniform data structure;
generate a retailer-agnostic curated destination environment ("CDE") including a video and a representation of a product, the video being stored on the host server;
generate a unique identifier ("ID") for the CDE, the CDE being accessible via a second URL that includes the unique ID;
cause the CDE to be presented within a second GUI, in response to a user interaction with a primary environment different from the CDE, the second GUI being associated with a mobile device of a user;
receive, at the host server during presentation of the CDE and in response to a first user interaction with the video, a message encoding a product selection;
identify a portion of the normalized product data associated with the product selection;
send a message to the first remote server, the message including the identified portion of the normalized product data, to cause instantiation and population of a first software shopping cart at the first remote server while the playback of the video continues without a browser of the mobile device of the user being redirected to the first remote server, the first remote server associated with a first retailer from the plurality of different retailers;
in response to a second user interaction with the CDE, the second user interaction made while the playback of the video continues, cause instantiation of a second software shopping cart at a second remote server associated with a second retailer from the plurality of different retailers while the playback of the video continues without the browser of the mobile device of the user being redirected to the second remote server; and
send, in response to a third user interaction with the CDE, the third user interaction representing a user selection of a checkout object within the CDE, a signal to cause the browser of the mobile device of the user to navigate to the first software shopping cart at the first remote server or to the second software shopping cart at the second remote server.

15. The non-transitory processor-readable medium of claim 14, the code further comprising code to cause the processor to: receive, at the host server during playback of the video and in response to the first user interaction with the CDE, a message encoding a retailer selection.

16. The non-transitory processor-readable medium of claim 14, wherein the first user interaction with the CDE is a selection of an "Add to Cart" button.

17. The non-transitory processor-readable medium of claim 14, wherein the first software shopping cart is accessible via the mobile device of the user.

18. The non-transitory processor-readable medium of claim 14, wherein the video includes a plurality of user-selectable objects.

* * * * *